BEST AVAILABLE COP'.
H. A. FOOTHORAP.
WRITING ADDING MACHINE.
APPLICATION FILED NOV. 4, 1912.

1,421,201.

Patented June 27, 1922.
11 SHEETS—SHEET 2.

WITNESSES

INVENTOR,
Harry A. Foothorap.
by L. G. Julihn Attorney

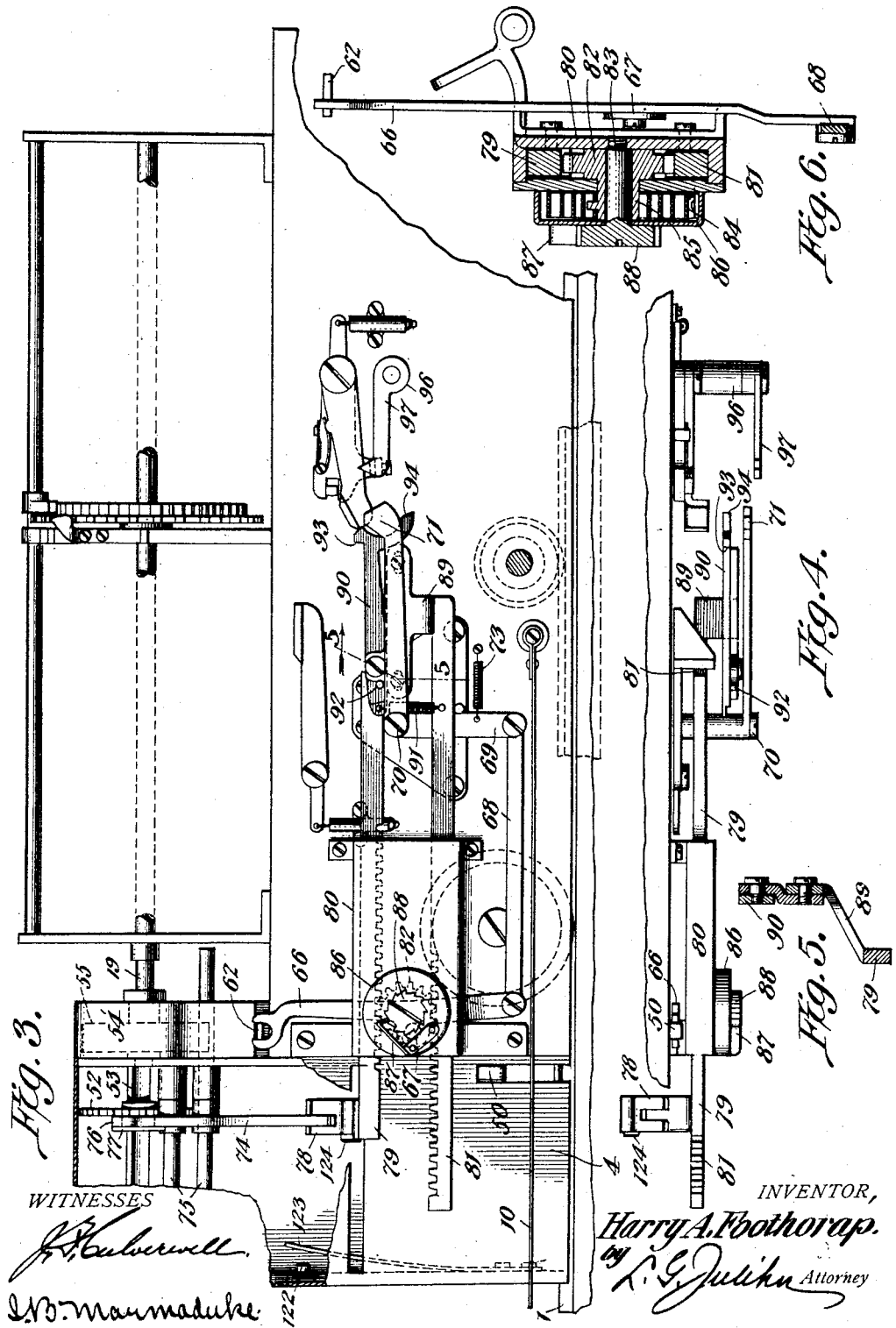

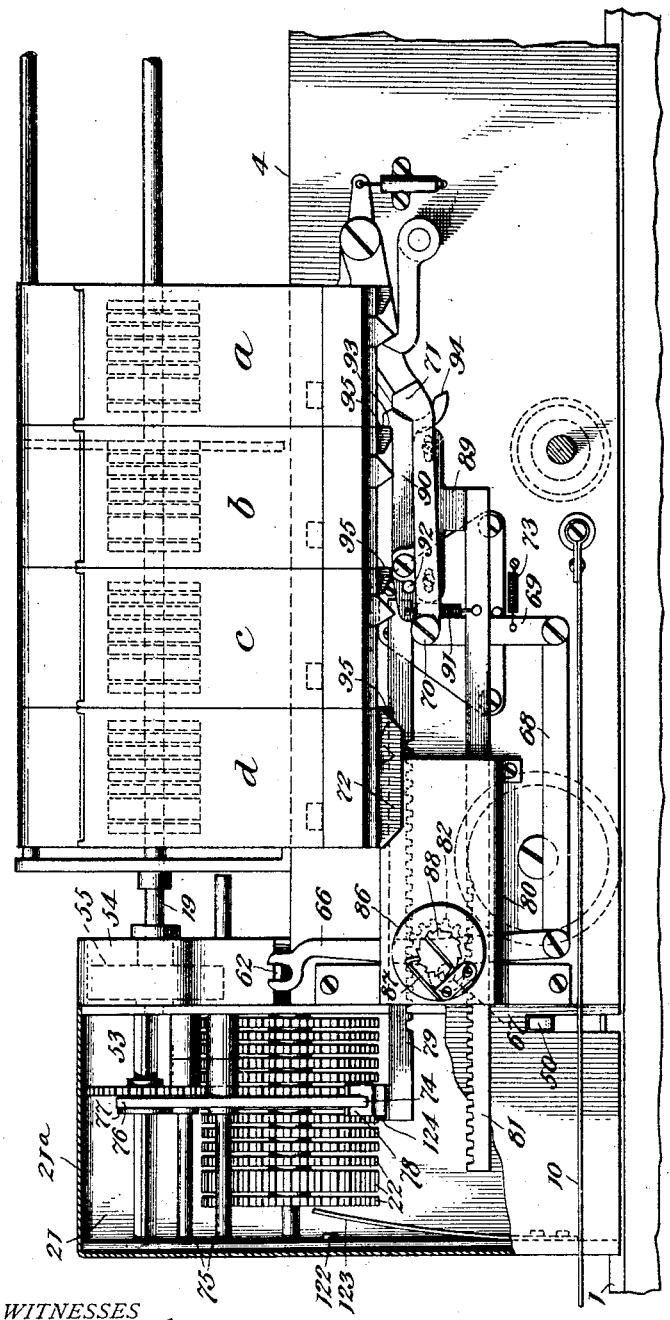

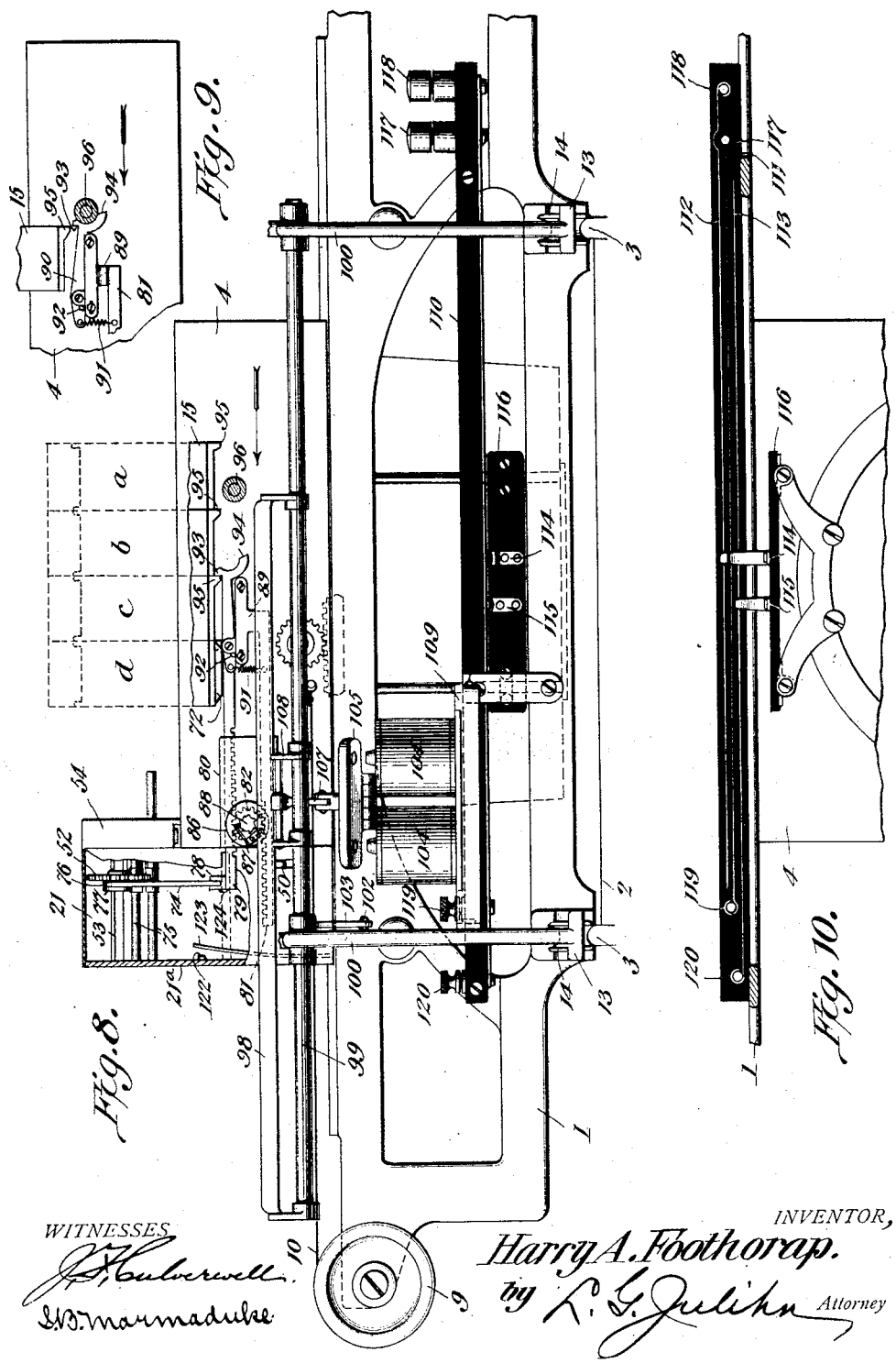

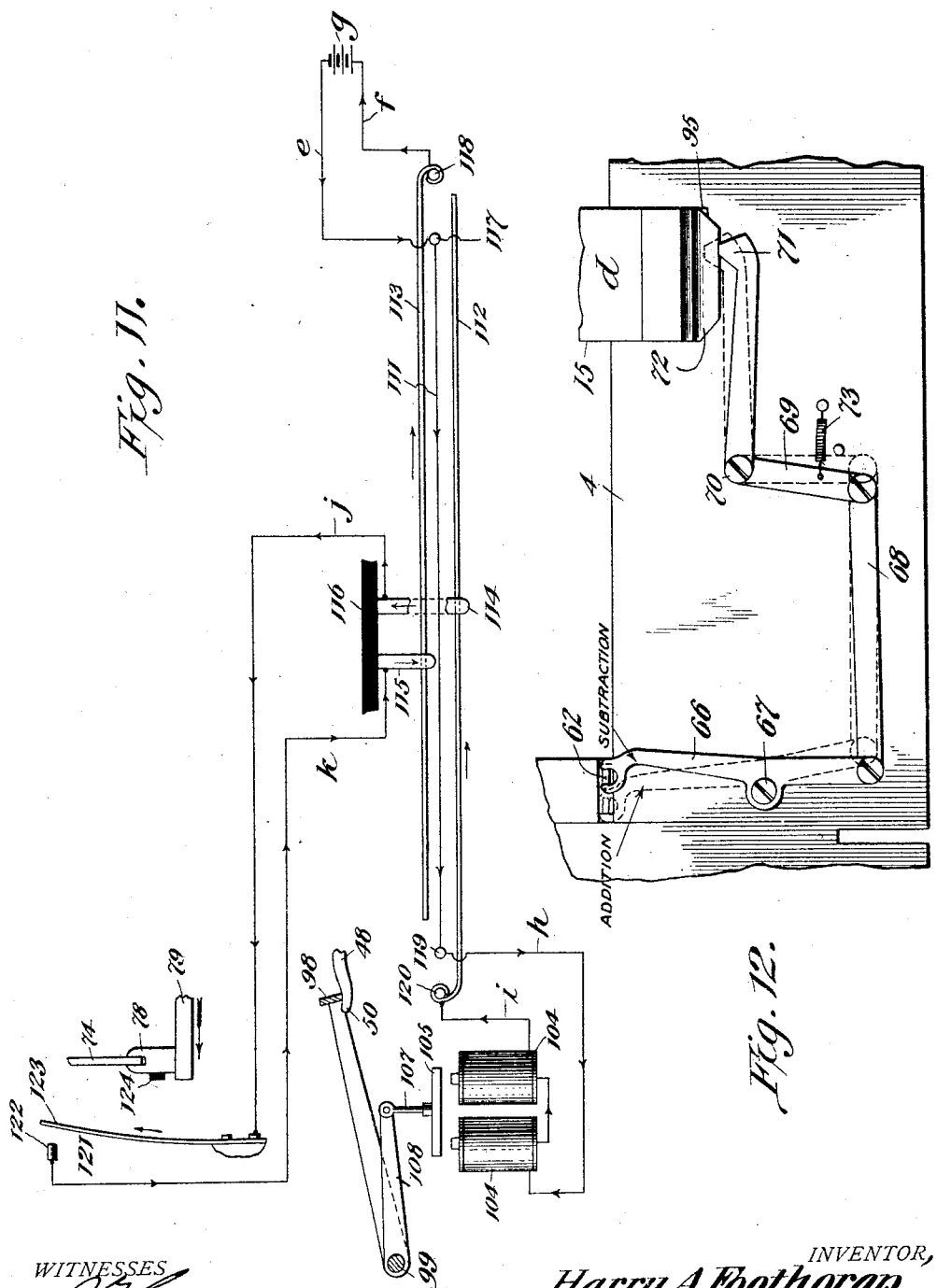

H. A. FOOTHORAP.
WRITING ADDING MACHINE.
APPLICATION FILED NOV. 4, 1912.

1,421,201. Patented June 27, 1922.
11 SHEETS—SHEET 8.

BEST AVAILABLE COP'

H. A. FOOTHORAP.
WRITING ADDING MACHINE.
APPLICATION FILED NOV. 4, 1912.

1,421,201. Patented June 27, 1922.
11 SHEETS—SHEET 9.

WITNESSES
INVENTOR,
Harry A. Foothorap.
by _____ Attorney

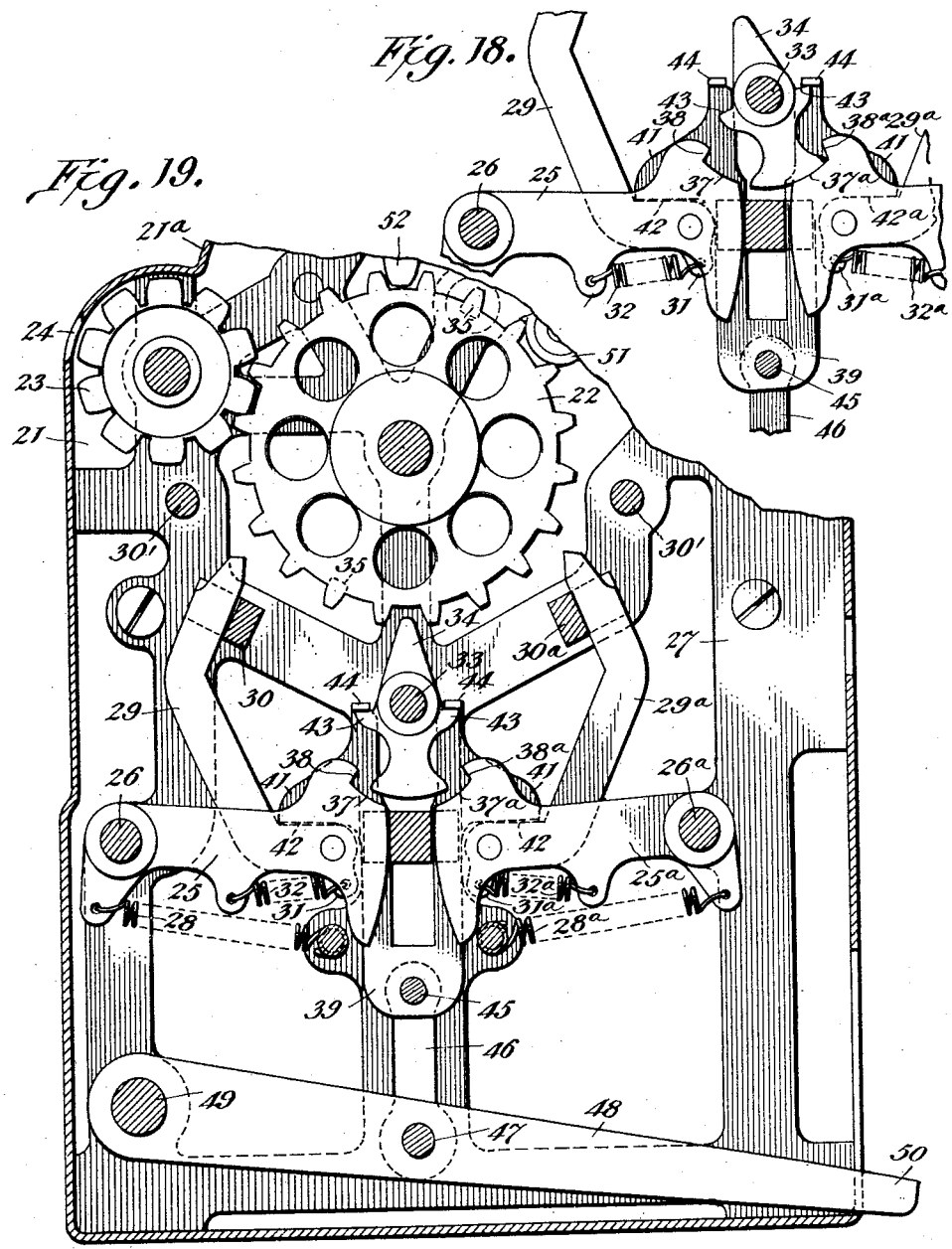

UNITED STATES PATENT OFFICE.

HARRY A. FOOTHORAP, OF HARRISBURG, PENNSYLVANIA, ASSIGNOR TO ELLIOTT-FISHER COMPANY, OF HARRISBURG, PENNSYLVANIA, A CORPORATION OF DELAWARE.

WRITING-ADDING MACHINE.

1,421,201.   Specification of Letters Patent.   Patented June 27, 1922.

Application filed November 4, 1912. Serial No. 729,383.

*To all whom it may concern:*

Be it known that I, HARRY A. FOOTHORAP, a citizen of the United States of America, residing at Harrisburg, in the county of Dauphin and State of Pennsylvania, have invented certain new and useful Improvements in Writing-Adding Machines, of which the following is a specification.

My present invention relates to writing adding machines, the illustrated embodiment thereof being a combined typewriting and adding machine of that class characterized by adding mechanism under the control of the numeral keys of the typewriter.

One of the objects of the invention is to equip a machine of this character with computing mechanism adapted to be operative for both adding and subtracting operations as the machine records in different column positions or fields whereby, after the record is made, the positive or negative excess of the values printed in different fields will be registered.

Another object is to equip a machine of this character with adding registers appropriated to several columns, a grand totalizer for computing the grand total of the values accumulated by the column registers and means whereby, when the grand total is printed, the grand totalizer will be automatically cleared.

Still another object of the invention is to provide the machine with column registers, a grand totalizer and a total register, together with automatic means controlling the character of operation of the grand totalizer so that as column totals are accumulated by the column registers, the grand total of the column totals will be accumulated by the totalizer and whereby, when the grand total is written, this amount will be registered by a grand total register and the grand totalizer simultaneously cleared to prove the work without destroying the registration of the grand total.

Various other objects subordinate to those enumerated will appear as the succeeding description of the illustrated embodiment of the invention is developed.

In the accompanying drawings:—

Figure 3 is a rear elevation of a portion of the machine showing more particularly those elements of the master wheel advancing mechanism and master wheel reversing mechanism which are mounted on the carriage.

Figure 4 is a plan view of most of the parts shown in Figure 3.

Figure 5 is a detail sectional view on the line 5—5 of Figure 3, showing the mounting of the retarding arm 90 on the lower rack.

Figure 6 is a detail sectional view through the retracting drum and adjacent parts of the master wheel advancing mechanism.

Figure 7 is a rear elevation of a portion of the machine designed more particularly to show the relation of the retarding stops and subtracting cam to the adjacent elements of the master wheel advancing and reversing mechanism.

Figure 8 is a view similar to Figure 7 with certain of the parts omitted but showing in addition the principal elements of the transfer restoring mechanism.

Figure 9 is a detail view showing the retarding arm cammed out of engagement with the retarding stop.

Figure 10 is a view showing more particularly the sliding contacts of the restoring mechanism.

Figure 11 is a diagrammatic view of the electric controlling and operating means for the transfer restoring mechanism of the two-way register.

Figure 12 is a detail view of the master wheel reversing mechanism or so much thereof as is necessary to illustrate the manner in which the retraction cam on the frame causes the shifting of the reversing lever.

Figure 18 is a sectional elevation of so much of the two-way register mechanism as is necessary to show the depression of a restoring slide to restore an operated carrying device and to bring said slide into engagement with an operative trip or latch preparatory to the restoration thereof.

Figure 19 is a view similar to Figure 16 but showing the restoring slide fully depressed and the operated carrying device and latch fully restored.

*The Elliott-Fisher Billing Machine.*

Figure 1:
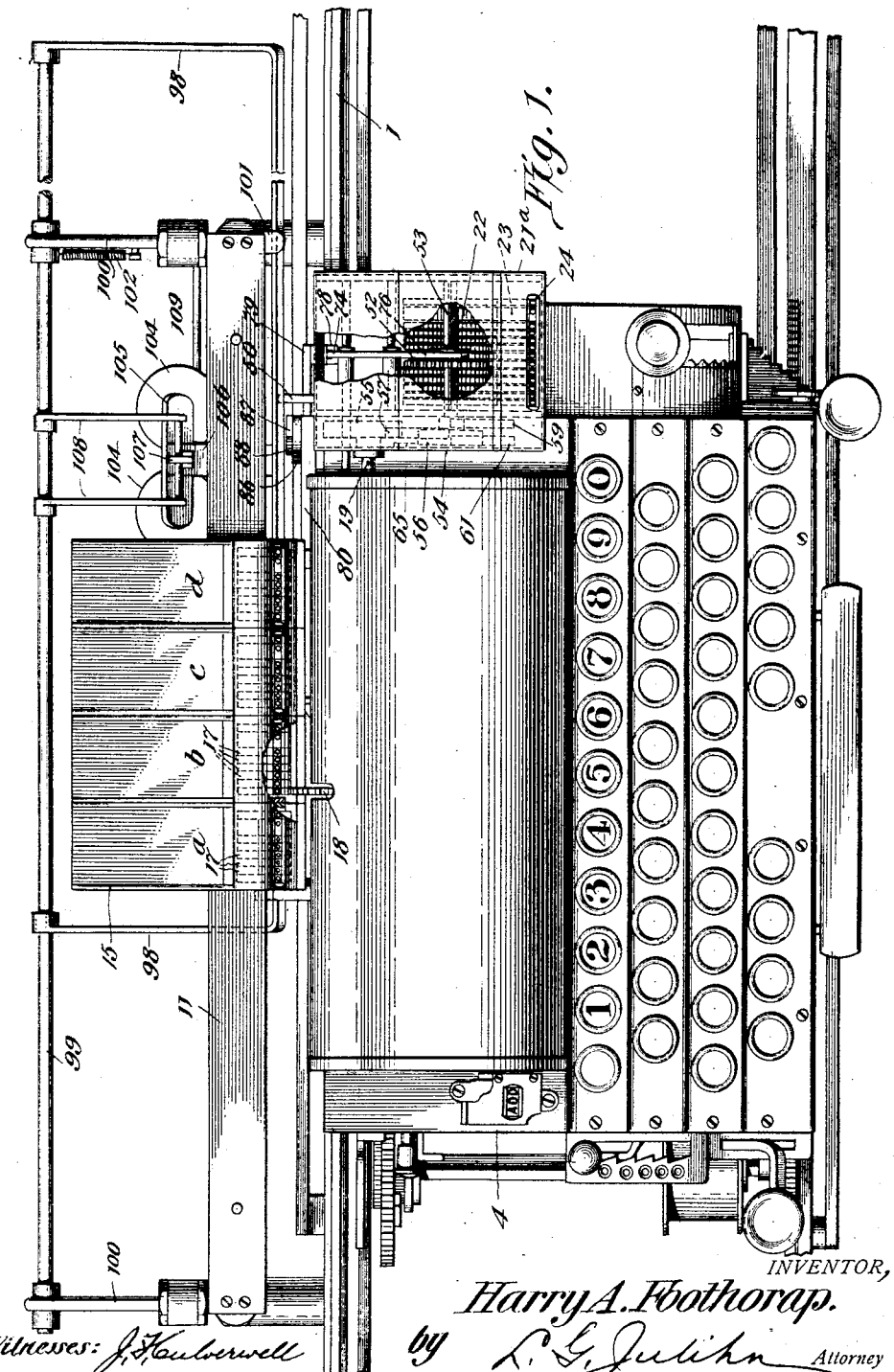
Figure 1 is a plan view of an Elliott-Fisher billing machine equipped in accordance with my invention, certain parts being broken away to facilitate the disclosure and certain well known parts being entirely omitted.

The machine illustrated herein is the Elliott-Fisher billing machine of commerce, a more complete disclosure of which may be had by reference to Patents #573,868 to Robert J. Fisher and #829,971 to Laganke and Smith, and the accompanying application of Laganke and Smith, Serial No. 308,279.

The Elliott-Fisher billing machine embraces a flat platen typewriter having a main frame 1 which travels longitudinally of a flat platen 2, on tracks or guides 3, to line space the writing. On the frame 1 travels transversely of the platen, for letter spacing, a carriage 4 supporting the traveling printing or recording mechanism 5, usually in the form of a series of type arms carrying suitable types 6 and operative by keys 7 through suitable intermediate connections 8. The carriage 4 is propelled to the right for letter spacing by carriage propelling mechanism in the form of spring drums 9 connected to the carriage by tapes 10, and the usual escapement mechanism, a showing of which is not necessary to this disclosure, is provided to place the carriage under the control of the keys.

In addition to the elements referred to, the machine is also equipped as usual with the ordinary appertinent requisite mechanisms of a typewriter, as for instance, ribbon mechanism, carriage release mechanism, tabulating mechanism, etc.

In rear of the carriage 4 is supported, as usual, by the frame 1, a register supporting bar 11 disposed parallel with the carriage with adjustable supporting brackets 12 interposed between the bar and what are known as the rear brackets 13 of the machine frame 1. The brackets 13 extend in rear of the frame 1 over the tracks 3 and are provided with rollers 14 engaging the tracks and constitute bearings located sufficiently in rear of the center of gravity of the machine to prevent possible tilting thereof when a large number of registers are mounted on the bar 11. Carried by the bar 11 and adjustable thereon to any desired column positions, are what are known as column registers 15. These registers are of well known construction and may be described briefly as computing devices, each of which includes a casing having mounted therein a series of denominational members in the form of number wheels 16 occupying different denominational positions and associated with carrying mechanism for transferring the value to the next higher denomination when the limit of value of a given denomination is reached, and restoring mechanisms for restoring the carrying mechanism and for returning the number wheels to zero. The number wheels 16 are toothed to engage a series of registering wheels 17 which register the accumulated value opposite a sight opening in the front of the register casing.

Mounted on the carriage 4 is what is known as the actuating mechanism for the computing devices or registers. This actuating mechanism includes a toothed master wheel 18, adapted to mesh with successive number wheels 16 as the carriage 4 of the typewriter advances step by step across the adding field or column. The position of the carriage 4, therefore, determines the denominational relation of the register and its master wheel or actuator 18 so that when the printing point of the typewriter is located to print in a given denomination of the column or adding field, the master wheel 18 will be engaged with the number wheel located in corresponding denominational position in the particular register appropriated to the column or adding field in which the printing mechanism is positioned to record.

The master wheel 18 is rotated upon the depression of the numeral key 7 of the typewriter, the degree of rotation corresponding in extent to the value of the particular numeral key depressed, so that the value accumulated in a register will correspond to the value of the digit printed by the depression of the key. This rotary movement of the master wheel is effected by what has come to be known as differential mechanism interposed between the master wheel and the numeral keys and embracing an actuator shaft 19 mounted in suitable bearings on the typewriter carriage and a series of graduated motion transmitting devices 20 intermediate of the shaft 19 and the several keys. It is usual to mount on the register bar 11 as many registers 15 as there are columns to be added. In the present disclosure are indicated four registers *a—b—c* and *d*, the registers *a—b* and *c* being used as column registers to accumulate column totals, and the register *d* being used for the registering of the grand total of the registers *a—b* and *c* as such grand total is recorded by the machine. For the purpose of distinction, therefore, the registers *a—b* and *c* will be called column registers and the register *d* a total register; though the register *d* is not adapted to automatically accumulate the grand total but is merely caused to register the grand total when the sum is written. The purpose of this arrangement will hereafter appear.

The two-way cross-footer.

I now come to the description of that part of the illustrated structure with which my present invention is more particularly concerned.

At the right hand end of the carriage 4 is secured what may be called a grand totalizer or a two-way cross-footer 21 including a casing $21^a$ in which is mounted a series of number wheels or denominational members 22 engaging and operating a series of registering wheels 23 disposed opposite the sight opening 24 in the casing $21^a$. Associated with the number wheels 22 are two sets of carrying levers 25 and $25^a$ fulcrumed at 26 and $26^a$ in a suitable skeleton frame 27 within the casing. These carrying levers are disposed in a substantially horizontal position and are urged in a direction to carry, by motor springs 28 and $28^a$ secured to the outer ends of the levers and to the frame 27. Pivoted to the carrying levers directly adjacent to their inner ends are carrying pawls 29 and $29^a$ of angular form, as shown, having their upper ends received and guided by combs 30 and $30^a$ fixed to the skeleton frame work 27. The driving pawls are provided with tail pieces 31 and $31^a$ to which are secured springs 32 and $32^a$, having their opposite ends secured to lugs projecting from the under edges of the levers 25 and $25^a$. The springs 32 and $32^a$ maintain a proper normal relation between the carrying levers and pawls, holding the pawls in their guides with their upper ends in position to engage teeth at opposite sides of the number wheels to advance or carry the wheels a single increment, in one direction or the other, accordingly as a carrying device of one set or the other is tripped to effect a transfer under adding or subtracting conditions. Mounted to rock on a shaft 33 directly under the axis of the number wheels is a single series of carrying or transfer trips, latches or selectors 34, each having a pointed upper end located in a plane intermediate of two number wheels to be engaged and operated by a carrying lug 35 projecting from the sides of one of the adjacent wheels 22. The lower end of each trip 34 is curved concentric with the axis of the trip to engage two similarly curved faces 37 and $37^a$ formed at the inner ends of the carrying levers and terminating in trip shoulders 38 and $38^a$ normally spaced somewhat from the adjacent sides of the trip. Normally the trips 34 occupy upright central positions with the lower end of each engaging two carrying levers, one of each set, to hold said levers in their normal or inactive positions against the resistance of their motor springs. If, however, the rotation of the adjacent number wheel causes a lug 35 thereon to engage and swing the upper end of a trip 34, the lower end of such trip will be swung in one direction or the other by an adding or subtracting movement of the number wheel, and the carrying lever, thus released from the trip, will be operated by its motor spring 25 or $25^a$ to advance its pawl 29 or $29^a$ which will engage the number wheel of next higher or lower order than the one which operated the trip thus advancing such number wheel one increment in one direction or the other, accordingly as the operation is under adding or subtracting conditions.

It is also to be noted that the carrying devices both carry and lock the number wheels so that when a wheel is advanced by a carrying device, overthrow of the wheel is prevented by the positive locking of the wheel as it reaches the limit of of a single increment of movement. It will be noticed that normally the pawls 29 and $29^a$ are out of interfering relation with the wheels 22, the tendency of the springs 32 and $32^a$ to swing the dogs toward the wheels being opposed by the fixed guides 30 and $30^a$. By reason of the angular form of the pawls, however, they are urged toward the wheels by their springs as soon as the carrying levers begin to rise. When the pawl of a released carrying device has moved into engagement with a wheel and carried the same, its movement is arrested by one of two stationary stop bars 30' which not only assists in urging the pawl toward the wheel but prevents the pawl from moving upward when struck by the tooth next succeeding that tooth of the number wheel with which the pawl is engaged. It will therefore appear that the carrying devices for the number wheels of the two-way register also constitute locking devices for said wheels.

The transfer restoring mechanism of the two-way register.

The restoration of the carrying mechanism to normal position is effected by a transfer restoring mechanism including a series of restoring slides 39 which, together with the inner ends of the carrying levers 25 and 25ª, are guided in a double comb guide extending across the register casing. The slides are in the form of bifurcated or substantially U-shaped plates having oppositely extending restoring arms 41 which, when the slides are drawn down, engage the substantially horizontal faces 42 of the transfer pawls and serve to retract any transfer device of either series which may have been operated. In other words, the single set of restoring slides is common to the two sets of transfer devices. Obviously, when the carrying devices are retracted they must be held in retracted position when the restoring slides are allowed to move up. Therefore, these slides 39 are arranged first to retract the carrying devices proper and then to restore to normal position any of the trips 34 which have been rocked to effect a carrying operation. The trips are, therefore, formed with oppositely extending substantially radial projections 43 which underlie trip restoring lugs 44 which are normally located a sufficient distance above the projections 43 of the trips to permit sufficient movement of the slides to restore the carrying devices before the lugs 44 engage the projections 43 to reset the trips. It will be obvious that by providing each slide with two lugs 44 adapted to coact with a trip at opposite sides thereof, the trip may be rocked in either direction which may be necessary to restore it to its normal central position. When the restoring slides are drawn down they first engage and restore the carrying devices. A slight continued movement, then effects the restoration or centering of the trips. Then when the restoring slides move up or back to normal position, they are followed by the carrying devices until the latter reach their normal positions where they are held by the restored trips during the remaining movement of the restoring slides back to normal position. The series of restoring slides 39 are connected for movement in unison by a transverse bar 45 from which depend a pair of links 46 connected by a rod 47 engaged at one end with the intermediate portion of a second class restoring lever 48, fulcrumed at 49, in the register casing, and having its rear end 50 projected through and beyond the rear wall of the casing to permit its actuation by mechanism mounted exteriorly of the two-way register, or by hand, as may be desired. The number wheels are engaged and aligned by spring urged roller detents or locators 51, as is usual in this class of mechanisms.

*The two-way master wheel.*

Figure 13:
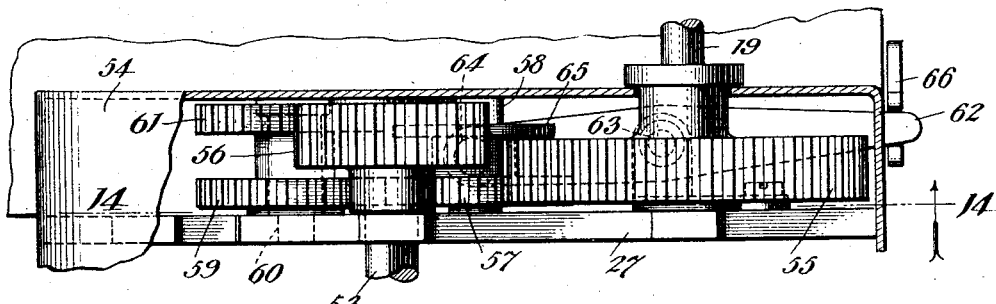
Figure 13 is a plan view partly in section of the gear case and the variable gearing therein, said gearing being organized for subtraction.
Figure 14:
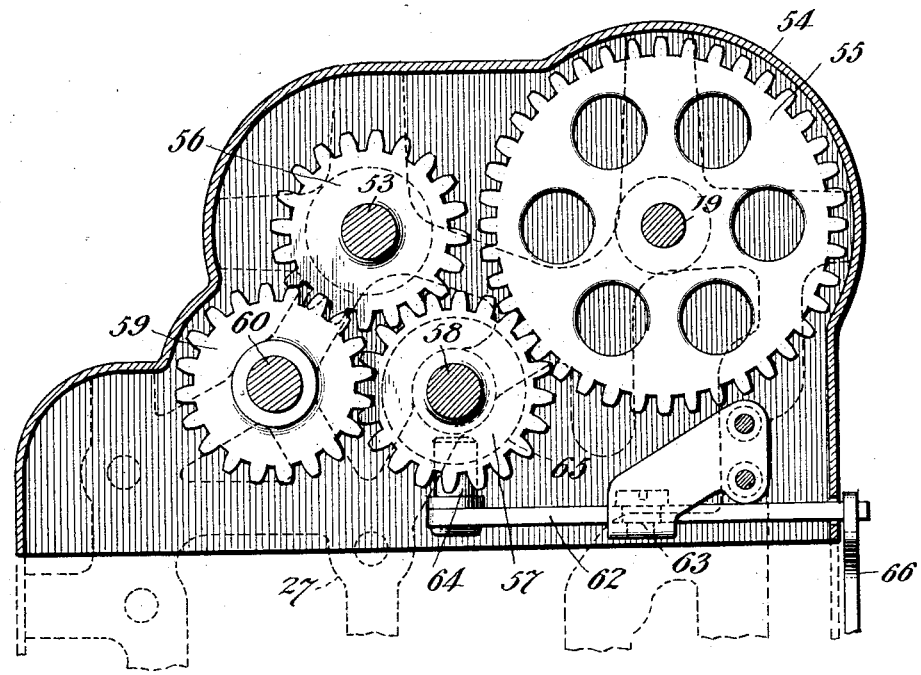
Figure 14 is a section on the line 14—14 of Figure 13, the variable gearing being shown in elevation.
Figure 15:
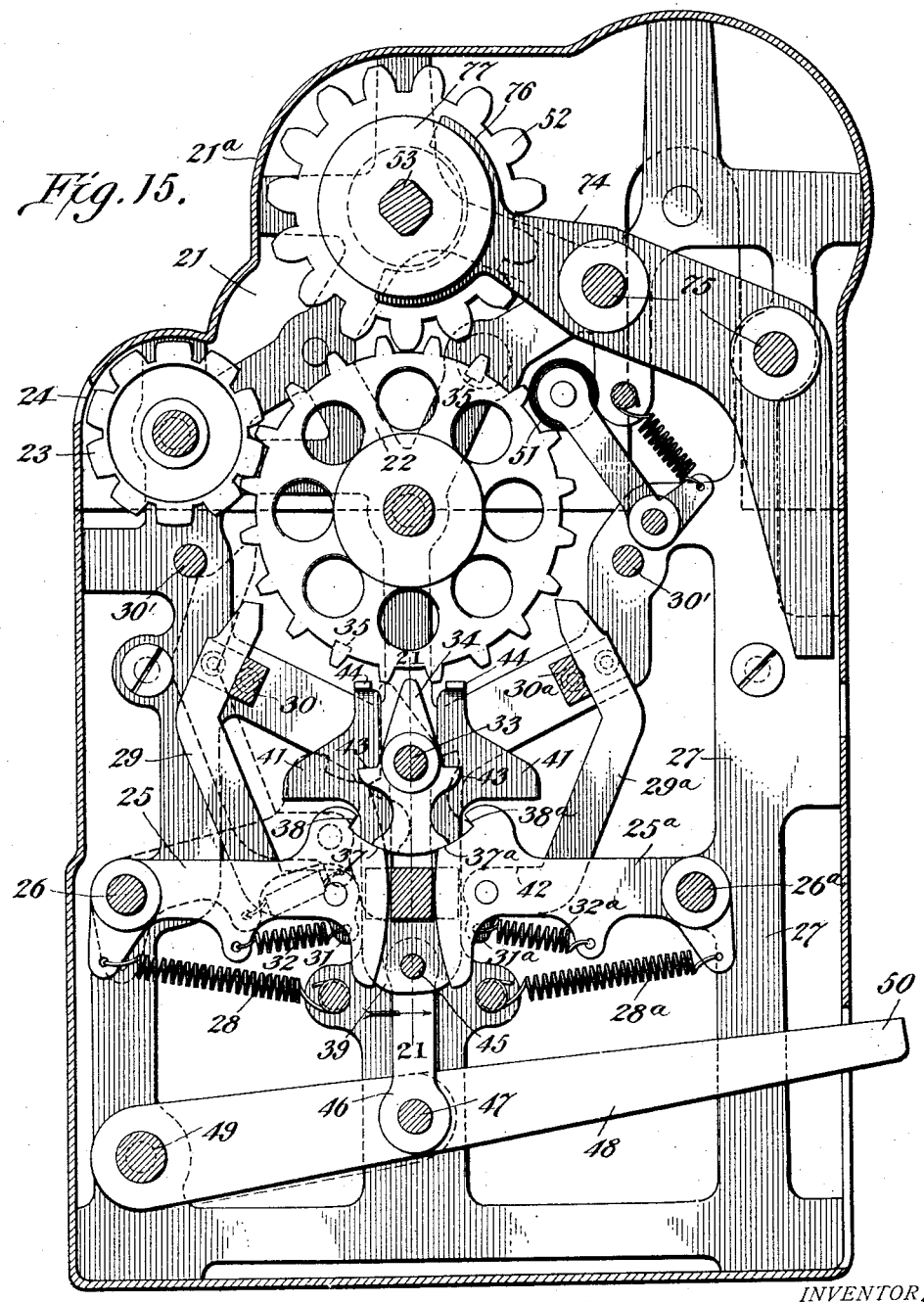
Figure 15 is a sectional view of the grand totalizer or two-way register, the parts being shown in normal position and the operated position of a carrying device of one set being indicated in dotted lines.
Figures 16, 17:
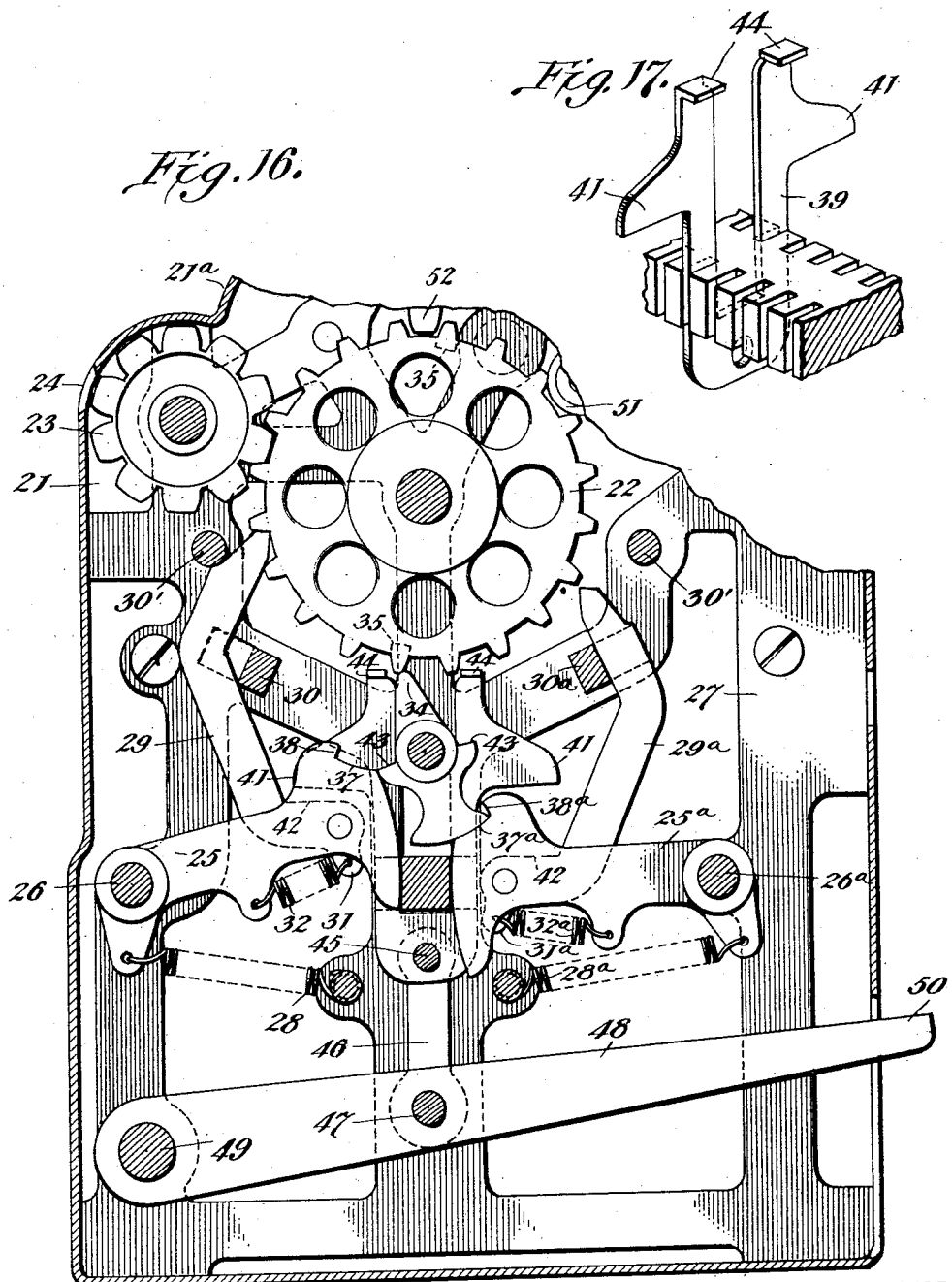
Figure 16 is a similar view with a carrying device of one set in operative position.
Figure 17 is a detail view of one of the restoring slides showing the manner of its mounting.
Figures 20, 21:
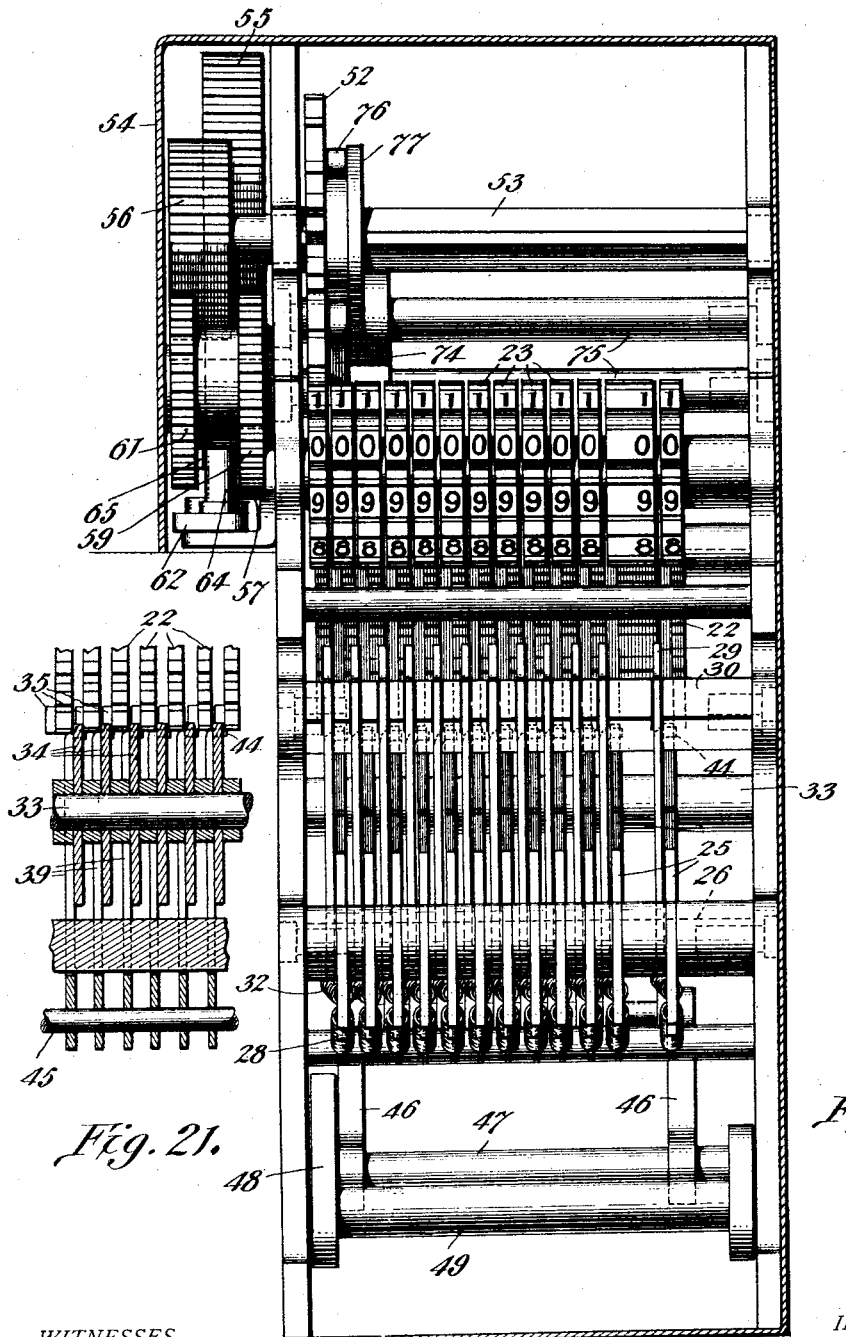
Figure 20 is a front elevation of a two-way register with casing in section.
Figure 21 is a detail section on line 21—21 of Figure 15.

The number wheels 22 of the two-way register are engaged by a two-way master wheel 52 which, for convenience, may be termed the secondary master wheel to distinguish it from the usual or primary master wheel 18 of the machine. The secondary master wheel 52 is movable within the two-way register casing across the series of number wheels and is carried by and shiftable on a secondary actuator shaft 53, one end of which is extended into a gear casing 54, preferably secured to one side of the two-way register 21. Within the gear casing 54 is mounted variable gearing whereby a variable driving connection may be established between the primary actuator shaft 19 and the secondary actuator shaft 53, the purpose being to cause either corresponding rotary movements of the two actuator shafts in the same direction when both master wheels are operated for addition, or corresponding rotary movements of said shafts in opposite directions when the master wheels are operated respectively for addition and subtraction. The form of gearing here shown includes a comparatively wide gear 55 fixed to the right hand end of the primary actuator shaft 19, a comparatively wide pinion 56 fixed to the left hand end of the actuator shaft 53, and a comparatively narrow shiftable pinion or change gear 57 mounted on a short shaft 58 and shiftable to different positions, as shown in Figure 13. In one position the shiftable pinion 57 constitutes a direct intermediate gear between the gear 55 and the pinion 56 and establishes a driving connection between the primary and secondary actuator shafts under adding conditions since the result of this gearing will be corresponding movements of the two shafts in the same direction. In another position, the shiftable pinion 57, while still engaging the gear 55 on the primary actuator shaft, will have moved out of mesh with the pinion 56 and into mesh with an intermediate pinion 59 mounted on a short shaft 60 and fixed to a second intermediate pinion 61 which is at all times in mesh with the pinion 56 on the secondary actuator shaft. When the shiftable pinion 57 is moved out of mesh with the pinion 56, a driving connection is established from the gear 55 on the primary actuator shaft to the pinion 57 to the pinion 59 to the pinion 61 and thence to the pinion 56 on the secondary actuator shaft. This latter connection results in corresponding rotary movements of the primary and secondary actuator shafts 19 and 53 in directions which, in the present mechanism, contemplates an adding operation of the primary master wheel and a subtracting operation of the secondary master wheel. The condition of the variable gearing between the two actuator shafts is controlled by a controlling lever 62 fulcrumed at 63 and having a roller 64 located between the gear 57 and a hub flange 65 thereon, to cause the shifting of the gear 57 when the lever 62 is swung. This lever 62 is known as the subtraction lever of the two-way register because the latter is normally organized to add and the lever, when it is desired to effect a subtracting operation of the two-way register is operated to reorganize the gearing for subtraction. The rear end of the lever 62 projects through and beyond the rear wall of the gear casing 54 and is engaged by the bifurcated upper end of a first-class lever 66 fulcrumed on the back of the carriage at 67 and having its lower end connected by a link 68 to the vertically disposed arm of a bell crank lever 69, fulcrumed at 70 on the back wall of the carriage and provided at the rear end of its horizontal arm with a cam 71. Ordinarily, as already stated, the subtraction lever 62 is in the adding position but when the printing point of the carriage moves opposite a column or writing field, the values to be printed in which are to be subtracted from the two-way register, the cam 71 must be thrown down to shift the lever 62 to the subtracting position and held down to maintain this condition of the gearing during the subtracting operation. While this may be done by hand, the present invention contemplates the automatic operation of the subtracting lever when the carriage arrives in a predetermined position, that is to say, when a predetermined column is reached. This may be done by mounting on a fixed part of the machine, as for instance, on the register bar 11, what may be called a subtracting cam 72 adjustable longitudinally of the bar to any desired point and disposed in the path of the cam 71 as the latter advances with the carriage. Thus when the carriage reaches a predetermined position determined by the location of the cam 72, said cam will be engaged by the cam 71 and further movement of the carriage will cause the cam 71 to ride down under the cam 72 to shift the subtracting lever 62 to the subtracting position where it will remain until the continued advance of the carriage carries the cam 71 past the cam 72 and permits a spring 73 to retract the bell crank 69, the subtracting lever 62 and the intermediate connections to the normal adding position.

*The advancing mechanism for the secondary master wheel.*

Normally the secondary master wheel 52 is located to the left of the series of number wheels 22 and out of mesh therewith so that ordinarily the two-way register is not operated and will remain idle while the machine is being utilized to record and add one or more columns. When the two-way register is called into action, however, the secondary master wheel is advanced into engaging relation with the successive number wheels 22 by automatically operated and controlled advancing mechanism. This mechanism includes what may be termed a master wheel carrier 74 movable within the casing of the two-way register on guide rods 75 and having at its front end a yoke 76 engaging the grooved hub 77 of the secondary master wheel 52 to compel the carrier 74 and said master wheel to move laterally in unison while permitting independent rotary movement of the wheel. The rear end of the carrier 74 depends into engagement with a bifurcated member 78 mounted at the right hand end of an upper rack bar 79 disposed horizontally in rear of the carriage casing and longitudinally movable through a guide casing 80 secured to the carriage. Below the upper rack bar 79 is a lower rack bar 81 likewise guided in the casing 80 and these upper and lower rack bars have toothed engagement with an intermediate spring urged retracting pinion 82, rotatable on a fixed spindle 83 and urged in one direction by a spring 84, one end of which is secured to the hub 85 of the gear 82 and the other end of which is secured to a winding case 86 provided with a pawl 87 designed to engage a fixed ratchet 88 constituting the head of the spindle 83. Normally as the rack bars 79 and 81 travel with the carriage no advancing movement is transmitted thereby to the secondary gear wheel 52 but it will be observed that if the movement of the rack bar 81 with the carriage is obstructed, it becomes a fixed rack upon which, during continued movement of the carriage, the gear 82 will be caused to travel, such rotary movement of the pinion being necessarily transmitted to the upper rack bar 79 which will advance just twice the distance traveled by the carriage. If, therefore, subsequent to the arrest of the bar 81 the carriage travels the distance of one letter space the secondary master wheel will travel the distance of two letter spaces relative to a fixed point or one letter space relative to the carriage. Therefore, by arresting the rack bar 81 each movement of the carriage from one letter space to the next will cause the advance of the secondary master wheel to successive number wheels 22 of the two-way register.

We have already seen that the control of the two-way register, with respect to the character of its operation, is effected automatically by means which comes into action at any predetermined point of the carriage travel, and an analogous mechanism will now be described for arresting the rack bar 81, at any desired point, to call the two-way register into action by advancing its master wheel into operative relation with its number wheels.

At the rear end of the rack bar 81 is mounted a T-shaped bracket 89 upon which is pivotally mounted a retarding arm 90, urged by a spring 91 to one limit of its movement where it is stopped by the engagement of a stop pin 92 with the bracket 89. At its rear end the retarding arm 90 is provided with a beak 93 and a releasing cam 94. Adapted to coact with the beak 93 is a retarding stop 95 which, like the cam 72, is mounted on a relatively fixed part, as, for instance, the register bar 11 along which it may be variously positioned to be engaged by the beak 93 to retard the arm 90 and the rack bar 81 when the carriage reaches that point of its travel at which it is desired that the secondary master wheel shall begin its traverse of the two-way register. Obviously, when, in the travel of the carriage, the beak 93 engages the retarding stop 95 continued movement of the carriage will cause the pinion 82 to be advanced along the rack 81 as heretofore described, so that as the carriage advances to successive letter spaces, the secondary actuator will be advanced to successive number wheels of the two-way register. Incidentally this rotary movement of the pinion 82 will wind the spring 84 which, when unrestrained, will effect a reverse rotation of the pinion to return the two racks 74 and 81 to their normal positions and restore the secondary master wheel to its initial position at the left hand side of the two-way register. Of course means must be provided for releasing the retarding arm 90 from the retarding lug 95 when the secondary master wheel has completed its traverse of the two-way register. It is for this reason that I provide the releasing cam 94 at the end of the arm 90. This cam is normally located a predetermined distance from some co-acting part movable with the carriage. In the present instance I utilize the shaft 96 of the usual decimal trip arm 97 which is ordinarily found on the Elliott-Fisher machine and coacts with projections on the registers to automatically trip the carriage over decimal and other spaces. The shaft 96 or more accurately the hub of the arm 97 mounted on said shaft is so spaced from the releasing cam 94 of the retarding arm 90 that when said arm has been retarded, and a continued movement of the carriage has caused the secondary master wheel to traverse the two-way register, the releasing cam will be engaged by the hub and cammed down to withdraw the beak 93 out of engagement with the retarding stop 95. The spring 84 being now unrestrained will reverse the rotation of the pinion 82 thus restoring the racks 79 and 81 and the master wheel 52 to normal position where they remain until the arm 90 is again arrested by the engagement of its beak 93 with another retarding stop 95 when, as will be apparent, the master wheel 52 will again traverse the two-way register and will, upon the depression of the numeral keys of the typewriter, be operated in one direction or the other to add or subtract accordingly as the subtracting cam 71 occupies its normal elevated position or its depressed position under a cam 72.

I have stated that the retarding stops 95 of the secondary master wheel advancing mechanism and the subtracting cam 72 of the mechanism which controls the character of operation of the two-way register, are adjustable upon a fixed part of the machine. As a matter of practice, however, the mounting and adjustment of these elements is facilitated by disposing them on the registers carried by the bar 11. This is for the reason that while the two-way register may be operated for adding and subtracting operations without reference to any other registers, it is particularly contemplated to establish a certain relation between the operations of the two-way register and the operations of the registers on the bar 11. For this reason I have shown each of the registers $a-b-c$ and $d$ on the register bar 11 equipped with retarding stops 95 in order that the secondary master wheel will be caused to traverse the two-way register in unison with the traverse of each of the other registers by the primary master wheel. For the same reason I have shown the register $d$ equipped with the subtracting cam 72 because, while it is designed to effect corresponding adding operations of the two-way register and each of the registers $a-b$ and $c$, it is contemplated to effect a subtracting operation of the two-way register when the register $d$ is operated for addition.

In passing, attention may be directed to the fact that since the carriage propelling mechanism or motor 9 causes the gear 82 to travel on the retarding rack 81 and to advance the secondary master wheel 52, the advance of said wheel is accomplished by power derived from the spring drums 9 in opposition to the retracting drum or motor 84. Furthermore, since the retarding tooth 95 is necessary to the arrest of the lower rack 81 and to the consequent advance of the secondary master wheel, said retarding stop constitutes variable means which, when set in the desired position, effects the automatic control of the master wheel advancing mechanism. Likewise this secondary master wheel advancing mechanism may be properly said to be under the control of the carriage, as also is the retracting means for the secondary master wheel, because the movement of the carriage brings the advancing mechanism into action and also effects the release of the retarding arm 90 from the stop 95 and causes the advancing mechanism to be rendered ineffective while rendering the retracting motor 84 effective to return the secondary master wheel to normal position.

The automatic restoring means.

Figure 2:
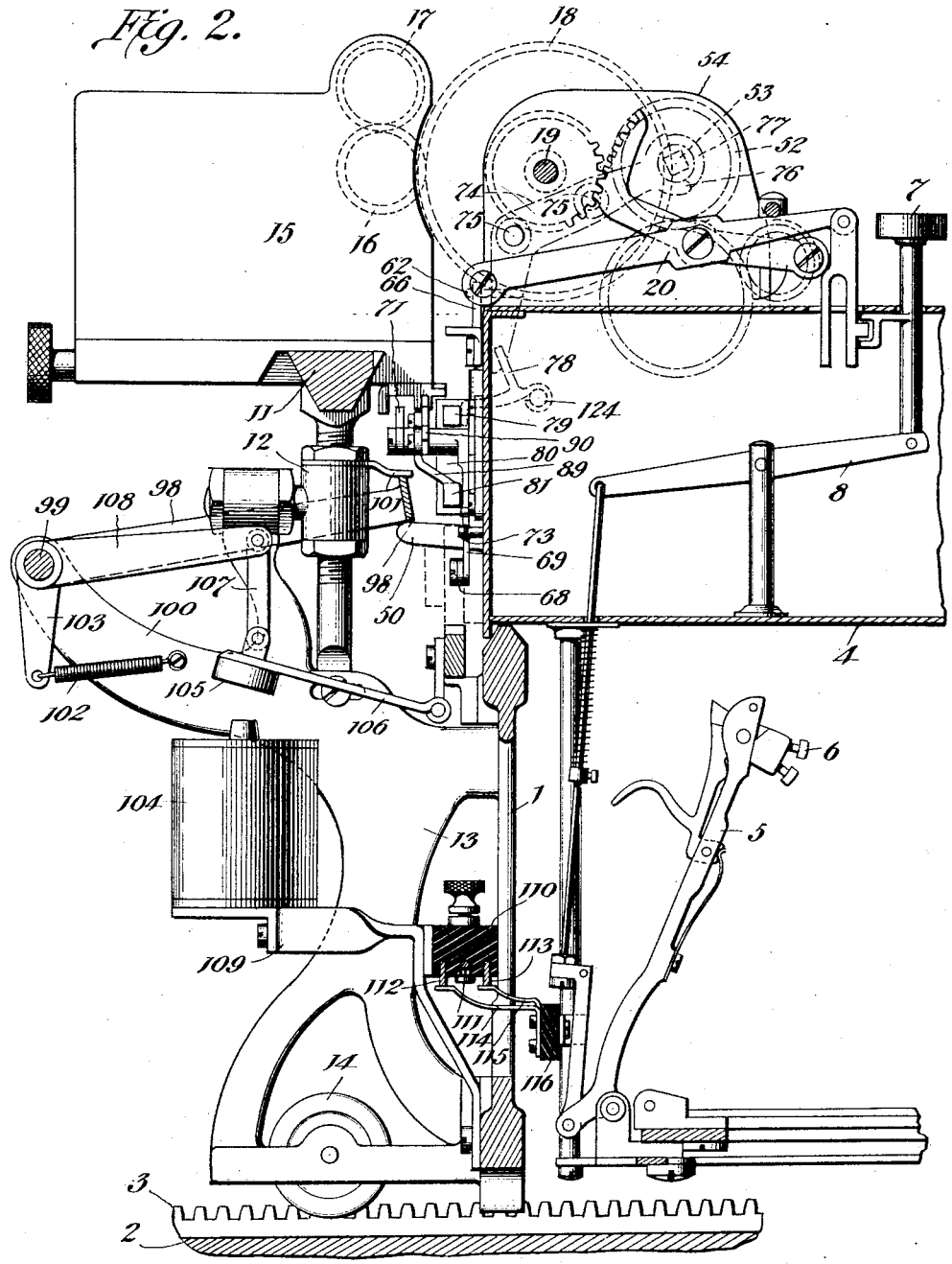
Figure 2 is a vertical sectional view of the subject-matter of Figure 1 showing certain of the parts in elevation, others broken away and still others omitted.

It has been stated that the rear end 50 of the restoring arm 48 of the two-way register extends in rear of said register and by reference to Figure 2, it will be noted that said arm underlies a restoring bail 98 fixed to and extended from a shaft 99 afforded bearing in rearwardly extending arms 100 of the brackets 13, as shown in Figure 2, said bail being co-extensive with the travel of the restoring arm 48, with the carriage 4. The bail 98 is normally held in elevated inactive position against a stop 101 by a spring 102 secured to one of the bracket extensions 100 and to a short arm 103 extended from the shaft 99. The restoring bail 98 is swung down to operate the arm 48 and restore the carrying mechanism of the two-way register after each traverse of said register by the two-way master wheel. This restoring of the two-way register may be accomplished in several ways but the illustrated arrangement includes an electric motor in the form of an electromagent 104 automatically energized to depress the bail 98. The armature 105 of the magnet 104 is carried by an arm 106 mounted to swing from the frame of the machine and connected by a link 107 to an arm 108 fixed to the shaft 99. The magnet 104 is carried by a bracket 109 secured to the frame of the machine and extended along the frame and in rear thereof is an insulating strip 110 in which are embedded three conductors 111—112 and 113, the conductors 112 and 113 being preferably parallel copper strips exposed below the insulation and engaged by a pair of contact springs 114 and 115 extended from an insulating block 116 movable with the carriage 4 and preferably secured to the supports of the recording mechanism. The right hand ends of the conductors 111 and 113, viewed from the rear of the machine, are equipped with binding posts 117 and 118 for the attachment of line wires $e$ and $f$, extending from a suitable source of electrical supply $g$. Ordinarily these line wires are part of the lighting system but a battery may obviously be utilized if necessary, or desirable. The left hand ends of the conductors 111 and 112, viewed from the rear, are provided with binding posts 119 and 120 to which are connected wires $h$ and $i$ leading to opposite sides of the electromagnet 104. Mounted within the casing of the two-way register is a circuit closing device 121 comprising a contact block 122 and a contact spring 123, the latter being normally out of contact with the block but adapted to be moved into contact therewith by a block 124 of insulating material movable with the upper rack 79 of the secondary master wheel advancing mechanism. From the contact spring 114, a wire $j$ is led to the spring 123 and another wire $k$ is led from the contact spring 115 to the plug 112. It will obviously be seen from the diagrammatic illustration in Figure 11, that normally the circuit through the electromagnet 104 is open but it will also be seen that when the secondary master wheel has completed a traverse of the two way register, the block 124 movable therewith will operate the circuit closing device 121 to close the circuit which may be traced as follows:

From the source of electric supply $g$ through the wire $e$ to the conductor 111, thence through the wire $h$ to the coils of the magnet 104, thence through the wire $i$ to the conductor 112, contact spring 114, wire $j$, spring 123, plug 122, wire $k$, contact spring 115, conductor 113 and wire $f$ to the source of electrical energy $g$.

It will be noted that while part of the circuit is mounted on the frame of the machine and part on the relatively movable carriage, it is, nevertheless, maintained in condition to become effective upon operation of the closer 121 because of the sliding contact between the two springs 114 and 115 movable with the carriage and the two long conductors 112 and 113 mounted on the frame and of sufficient length to accommodate the carriage travel. Obviously, therefore, if at any point in the travel of the carriage the two-way register is brought into action, the magnet 104 will be automatically energized and the carrying mechanism of the two-way register automatically restored to normal position after each traverse of said register by its master wheel.

While a great variety of operations are possible with the machine equipped in accordance with my invention, since a great variety of operative conditions may be afforded for the two-way register by variation in the number and relative adjustment of the subtraction cams 72 and retarding stops 95, as well as by the utilization of varying numbers of column registers occupying various relative positions. nevertheless, the arrangement shown in the drawings is illustrative of one especially desirable mode of operation of the machine which may be particularly described. It is contemplated to use the registers $a$—$b$ and $c$ as column registers operated in succession by the primary master wheel 18 to accumulate the totals of three columns of figures, each column total being displayed by the register appropriated to the column. The two-way register 21 is intended to be operated in correspondence with each of the column registers $a$—$b$ and $c$ to compute and register the grand total, to wit, the sum of the column totals. It is for this reason that each of the registers *a—b* and *c* is provided with a retarding stop 95 so that the secondary master wheel advancing mechanism may be caused to traverse the two-way register for adding operations thereof, as the primary master wheel traverses and operates successive column registers. Having computed the grand total, it is desirable to print the same. At the same time it is desirable to prove that the grand total has been properly copied by clearing the two-way register by a subtracting operation effected simultaneously with and as a direct result of the writing of the grand total. Ordinarily, however, this method of proving the grand total results in the elimination thereof from the register, whereas it is desirable to both prove the grand total and retain the registration thereof. To meet the opposed requirements, I provide an addition to the three column registers *a—b* and *c* and the two-way register 21, a total register *d* located opposite that field of the writing surface in which the grand total is copied from the two-way register. When the computation is completed, the primary master wheel 18 passes to a position opposite the register *d*, which is provided with both a retarding stop 95 and a subtraction cam 72, so that while the grand total is being copied it will be set up in the total register *d*, and simultaneously subtracted out of the two-way register 21. Thus the grand total will be simultaneously written, subtracted out of the two-way register for proof and re-registered in the register *d*.

At this point, attention may be directed to a desirable and novel characteristic of the master wheel advancing mechanism. It is customary in practice to mount on the register bar of an Elliott-Fisher machine, such as is here shown, registers of various widths, what is known as narrow column work requiring only three or four number wheels and other work requiring a greater number of wheels and consequently wider registers. It is desirable, therefore, that the master wheel advancing mechanism of my invention, here shown, be so arranged that it will accommodate itself to registers of any width or of varying widths. This requirement is met because in practice each retarding stop 95 is located at a predetermined distance from the right hand side of the register, that is to say, from the number wheel of lowest order, regardless of the width of the register, and in their normal relation the releasing cam 94 of the retarding arm and the coacting part 96 on the carriage are separated by an interval sufficient to provide for a maximum travel of the secondary master wheel 52 across the two-way register. It will be seen, however, that when the master wheel 52 has traversed the two-way register and is released, its immediate retraction will carry the cam 94 away from the part 96, thus permitting the beak 93 of the retarding arm to rise so that it will be arrested by the next retarding stop. Therefore, if the register happens to be narrow, the retraction of the master wheel 52 will be arrested before it has returned to the extreme limit of the two-way register. On the contrary, it would be arrested opposite that number wheel of the two-way register which corresponds in denominational position to the number wheel of the highest order of the column register. Therefore, the retractile movement of the secondary master wheel accommodates itself automatically to the width of the particular column register to be operated or in the absence of such register, to the width of the particular column or field in which the numbers are to be recorded. Notwithstanding this incomplete and variable retraction of the master wheel 52, however, the automatic restoring mechanism of the two-way register will be operated with certainty after the accumulation of each number by the two-way register, because while the limit of retractile movement of the master wheel is variable, the limit of its advancing movement is fixed and it is at this fixed limit of the forward movement of the master wheel that the circuit is closed to bring the restoring mechanism into action.

It is believed that, from the foregoing, the construction and mode of operation of my invention will be clearly understood, but I reserve the right to effect such modifications and variations of the illustrated structure as may fall properly within the scope of the protection prayed.

What I claim is:—

1. In a writing adding machine, the combination with a typewriter including a carriage, keys and printing mechanism, of a register operative for addition or subtraction and including a series of denominational members, a master actuator for the register, said register and actuator being normally stationary as to relative lateral movement during the movement of the carriage, means placing the master actuator under the control of the keys, variable means automatically operated by the carriage to cause relative lateral movement of the actuator and register at any predetermined point in the movement of the carriage, and variable means also brought into action automatically at any predetermined point in the movement of the carriage to determine the character of operation of the register.

2. In a writing adding machine, the combination with a typewriter including a carriage, keys and printing mechanism, of a register carried by and movable with the carriage and operative for addition or subtraction, a master actuator also carried by the carriage and adapted to operate said register for addition or subtraction under the control of the keys, said register and actuator being stationary as to relative lateral movement during the travel of the carriage, means brought into action by the travel of the carriage to cause the traverse of the register by the master actuator, and automatic means also brought into action by the movement of the carriage to determine whether the register shall operate for addition or subtraction.

3. In a writing adding machine, the combination with a carriage, keys and printing mechanism, of a register movable with the carriage and operative for addition or subtraction, register operating means also movable with the carriage and under the control of the keys, and means brought into action automatically by the movement of the carriage to determine whether the register shall be operated for addition or subtraction.

4. In a writing adding machine, the combination with a carriage, keys and printing mechanism, of a register and actuating means therefor, both movable with the carriage and under the control of the keys, said register and its actuating means being normally stationary as to relative lateral movement during the travel of the carriage, variable means brought into action by the travel of the carriage at any desired point in its movement to cause relative lateral movement of the register and its actuating means, and means also brought into action by the movement of the carriage to determine whether the register shall operate for addition or subtraction.

5. In a writing adding machine, the combination with a traveling carriage, recording mechanism and keys movable with the carriage, of a two-way register also movable with the carriage, a master actuator movable with the carriage and under the control of the keys, and means operative automatically at a predetermined point in the carriage travel to control the direction of operative movement of the master actuator.

6. In a writing adding machine, the combination with a carriage, keys and printing mechanism, of a two-way register movable with the carriage, a master actuator operative in opposite directions under the control of the keys and normally operative for addition, variable means for causing the master actuator to begin its traverse of the register at any predetermined point in the movement of the carriage, and variable means for causing the master actuator to operate for subtraction when operated with the carriage in given positions.

7. In a writing adding machine, the combination with a carriage, keys and printing mechanism, of a register movable with the carriage, a master actuator also movable with the carriage and under the control of the keys, and mechanism for causing the master actuator to advance across the register, said advancing mechanism comprising two relatively movable members mounted on the carriage, one of said members being connected to the actuator and the other adapted for retardation with respect to its travel with the carriage, variable means for retarding said last named member at a given point in the travel of the carriage, and means coacting with said two relatively movable members to compel their relative movement and the consequent advance of the actuator when one of the members is retarded.

8. In a writing adding machine, the combination with a carriage, keys and printing mechanism, of a register movable with the carriage, a master actuator operative under the control of the keys and adapted to traverse the register, advancing or traversing means for the actuator comprising a pair of reciprocatory racks and an intermediate pinion normally movable with the carriage and stationary relative to each other, a connection between one of the racks and the actuator, and means for arresting the movement of the other rack while the carriage continues its travel.

9. In a writing adding machine, the combination with a carriage, keys and printing mechanism, of a register movable with the carriage, a master actuator for the register, said actuator being under the control of the keys and movable back and forth across the register, a pair of reciprocatory racks mounted on the carriage, a gear intermediate of said racks, a connection between one rack and the actuator, and means brought into action by movement with the carriage to hold one of said racks stationary during further movement of the carriage.

10. In a writing adding machine, the combination with a carriage, keys and printing mechanism, of a register movable with the carriage, a master actuator for the register, said actuator being under the control of the keys, actuator advancing mechanism including a pair of racks, an intermediate coacting pinion mounted on the carriage, means for holding one of the racks stationary relative to the carriage to cause the advance of the actuator across the register, and means for releasing the arrested rack.

11. In a writing adding machine, the combination with a carriage, keys and printing mechanism, of a register movable with the carriage, a master actuator for the register, said actuator being under the control of the keys, means for advancing the actuator across the register, said means including two coacting members adapted to be brought into engagement by the movement of the carriage, and camming means operated by the movement of the carriage to disengage said members by a camming action.

12. In a printing adding machine, the combination with a carriage, keys and printing mechanism, of a register movable with the carriage, a master actuator controlled by the keys and movable across the register, actuator advancing mechanism including a pair of racks and an intermediate pinion mounted on the carriage, arresting means for holding one of the racks stationary during movement with the carriage, and automatic means for releasing the rack from its arresting means.

13. A writing adding machine including a frame, a carriage, keys and printing mechanism, of a register movable with the carriage, an actuator therefor controlled by the keys, actuator advancing mechanism including a pair of racks and an intermediate pinion mounted on the carriage, a retarding stop mounted on the frame, means associated with the rack to engage the retarding stop, and means for rendering the retarding stop inoperative.

14. A writing adding machine including a frame, a carriage, keys and printing mechanism, of a register movable with the carriage, a master actuator for the register and controlled by the keys, means for advancing the actuator across the register, said means including a pair of racks, an intermediate pinion and a retarding arm carried by one of the racks, a retarding stop adapted to be engaged by the retarding arm, and means for moving the retarding arm out of engagement with the stop.

15. A writing adding machine including a frame, a carriage, keys and printing mechanism, of a register movable with the carriage, an actuator for the register movable with the carriage, an actuator for the register, actuator advancing mechanism including a pair of racks movable with the carriage, a pinion intermediate of the racks, a connection between one of the racks and the actuator and a retarding arm carried by the other rack, a retarding stop mounted on the frame in position to be engaged by the retarding arm, and releasing means movable with the carriage to engage the retarding arm and to release the same from the retarding stop.

16. A writing adding machine including a carriage, keys and printing mechanism, of a register movable with the carriage, a master actuator under the control of the keys and adapted to move back and forth across the register, actuator advancing mechanism including a pair of racks and an intermediate pinion mounted on the carriage, and a retracting motor associated with the pinion.

17. In a writing adding machine, the combination with a frame, a carriage, keys and printing mechanism, of a register, a master actuator therefor, and mechanism for compelling relative lateral movement of the register and its actuator to change the denominational relation thereof, said last named mechanism including a retarding stop adjustable on the frame, and a device brought into engagement with said stop and arrested thereby to compel relatively lateral movement of the register and its actuator during movement of the carriage subsequent to such arrest.

18. A writing adding machine including carriage, keys and printing mechanism, of a register, a master actuator therefor, a connection between the keys and actuator including a reversing gear adapted to drive the actuator in either of two directions, variable means for operating the reversing gear at any desired point in the movement of the carriage to reverse the movement of the actuator and shiftable to various positions in the direction of the carriage travel, and mechanism operative to change the denominational relation of the actuator and register.

19. In a writing adding machine, the combination with a frame, carriage, keys and printing mechanism, of a two-way register movable with the carriage, a two-way actuator for the register, a connection between the actuator and the keys, said connection including a reversing gear, means controlling the position of the reversing gear and including a coacting arm and cam mounted on the frame and carriage respectively, one of said elements being adjustable on the frame lengthwise of the carriage movement, and mechanism including coacting parts likewise mounted on the frame and carriage to change the denominational relation of the actuator and register.

20. In a writing adding machine, the combination with a frame, a carriage, keys and printing mechanism, of a two-way register, an actuator therefor, a connection between the actuator and keys including a reversing gear, means for shifting said gear, said means including coacting elements mounted on the frame and carriage and one of said elements being adjustable lengthwise of the carriage movement and mechanism for changing the denominational relation of the actuator and register, said last named mechanism likewise including coacting parts mounted on the frame and carriage respectively, and one of said elements being adjustable lengthwise of the carriage movement.

21. In a writing adding machine, the combination with a frame, carriage, keys and printing mechanism, of a two-way register movable with the carriage, a master actuator therefor also movable with the carriage and normally under the control of the keys to operate for addition, a retarding stop and a retraction cam both adjustable on the frame, means brought into engagement with the retarding stop by the movement of the carriage to cause the advance of the actuator across the register, and means brought into engagement with the retraction cam by the movement of the carriage to reverse the connection between the actuator and keys.

22. The combination with a register including denominational members, carrying mechanism and restoring means for the carrying mechanism, of an actuator for the register, said actuator and register being relatively movable laterally to change their denominational relation, a motor arranged to operate the restoring mechanism of the register, and means whereby relative movement of the register and actuator in one direction will bring the motor into action and relative movement of the register and actuator in the opposite direction will render the motor ineffective.

23. In a writing adding machine, the combination with a frame and carriage, of a register movable with the carriage and including denominational members, carrying mechanism, and restoring means for the carrying mechanism, a motor mounted on the frame, means whereby an operative connection will be established between the motor and restoring means in different positions of the carriage, and means operated by the movement of the carriage and controlling the operation of the motor.

24. In a writing adding machine, the combination with a frame and carriage, of a register movable with the carriage and including denominational members and carrying mechanism, means for operating the register, a motor operated restoring means for the carrying mechanism, and means whereby said motor operated restoring means will be automatically controlled by the carriage.

25. In a writing adding machine, the combination with a frame and carriage, of a register movable with the carriage and including denominational members and carrying mechanism, restoring means for said carrying mechanism including a motor mounted on the frame, and automatic controlling means for the motor, said controlling means being brought into action by the movement of the carriage to restore the carrying mechanism.

26. In a writing adding machine, the combination with a frame and carriage, of a register including a series of denominational members and carrying mechanism, actuating means for the register, the denominational relation of the register and its actuating means being controlled by the movement of the carriage, motor operated restoring means for the carrying mechanism of the register, and means controlling the operation of the restoring means and variable to determine the point in the travel of the carriage at which the restoring means will become effective.

27. In a writing adding machine, the combination with a frame and carriage, of a register including denominational members and carrying mechanism, means for operating the register, restoring means for the carrying mechanism including the motor, and means controlling the operation of the restoring means and including a series of relatively adjustable devices arranged to determine successive points in the travel of the carriage at which the restoring mechanism will become effective.

28. In a writing adding machine, the combination with a frame and carriage, of a register including denominational members and spring operated carrying mechanism, motor operated restoring mechanism for the carrying mechanism of the register, and carriage operated means for causing the restoring mechanism to operate to repeatedly restore the carrying mechanism of the register during a single traverse of the frame by the carriage.

29. In a writing adding machine, the combination with a frame and carriage, of a register including denominational members and spring operated carrying mechanism, means for operating the register repeatedly during a single traverse of the frame by the carriage, restoring means for the carrying mechanism of the register, and means for causing the repeated operation of the restoring means during a single traverse of the frame by the carriage.

30. In a writing adding machine, the combination with a frame and carriage, of a register including denominational members and carrying mechanism which is tripped to effect the transfer, means for operating the register repeatedly during a single traverse of the frame by the carriage, and automatic means for retracting or restoring the carrying mechanism of the register after each complete operation of the latter.

31. In a writing adding machine, the combination with a frame and carriage, of a register including denominational members and spring operated carrying mechanism, actuating means for the register, restoring means for the carrying mechanism of the register, and means for determining at what point in the carriage travel the register will become operative and also at what point in the carriage travel the restoring mechanism will become operative, said last named means including a device adjustable to predetermined positions lengthwise of the carriage travel.

32. In a writing adding machine, the combination with a frame and carriage, of a register including a series of denominational members and carrying mechanism, a master actuator for the register, said actuator and register being relatively movable in lateral direction to change their denominational relation, but normally relatively stationary during the travel of the carriage, variable means adapted to determine the portion of the carriage travel during which the denominational relation of the register and its actuator will be changed, and restoring means for the carrying mechanism, said restoring means being controlled by the relative lateral movement of the register and its actuator.

33. In a writing adding machine, the combination with a frame and carriage, of a register movable with the carriage and including denominational members and carrying mechanism, an actuator for the register also movable with the carriage but normally stationary with relation to the register, means for automatically causing the actuator to traverse the register at a given point in the movement of the carriage, and means for automatically restoring the carrying mechanism of the register after each complete operation of the latter to accumulate the value of a complete member.

34. In a writing adding machine, the combination with a frame and carriage, of a register movable with the carriage and including denominational members and carrying mechanism, an actuator for the register, the denominational relation of the register and actuator being controlled by the movement of the carriage, means for causing the same denominational relation to be established between the register and the actuator at successive points in a single traverse of the frame by the carriage, restoring means for the carrying mechanism, and means for causing said restoring means to operate repeatedly during a single traverse of the frame by the carriage.

35. In a writing adding machine, the combination with a frame and carriage, of a register and a master actuator therefor both movable with the carriage, said register including a series of denominational members and carrying mechanism, means including a series of variable devices arranged to determine those portions of the carriage travel during which the register shall be operative by its master actuator, and means controlled by said devices for restoring the carrying mechanism of the register.

36. In a writing adding machine, the combination with a frame and carriage, of a register movable with the carriage and including denominational members for the carrying mechanism, actuating mechanism for the register, means for restoring the carrying mechanism, and means controlling the operation of the restoring means and including a device adjustable to different positions on the frame to determine the point in the carriage travel at which the restoring means shall operate.

37. In a writing adding machine, the combination with a frame and carriage, of a register including denominational members and carrying mechanism, actuating mechanism for the register, said register being normally inoperative by its actuating mechanism, restoring means for the carrying mechanism, and means including a plurality of devices relatively adjustable on the frame to render the register operative when predetermined writing fields are reached by the travel of the carriage and to render the restoring means operative after each accumulation of a complete number by the register.

38. In a writing adding machine, the combination with a frame and carriage, of a register and its actuator both movable with the carriage and also relatively movable to change their denominational relation, said register including denominational members and carrying mechanism, restoring means for the carrying mechanism including a motor mounted on the frame, and means including a series of devices relatively adjustable on the frame to predetermine those points in the travel of the carriage at which the restoring mechanism will become effective to restore the carrying mechanism of the register.

39. In a writing adding machine, the combination with a frame and carriage, of a computing device including denominational members and carrying mechanism, electrical restoring means for the carrying mechanism including a circuit closer, the operation of which brings the restoring means into action, means for operating the register, and means for repeatedly operating the circuit closer during a single traverse of the frame by the carriage to cause repeated operations of the restoring means during such traverse.

40. In a writing adding machine, the combination with a frame and carriage, of a register including a series of denominational members and carrying mechanism which is tripped to effect the transfer, means for operating the register, restoring means for the carrying mechanism including an electric motor and a circuit closer mounted on the carriage and controlling the operation of the motor, and means including a device adjustable to different positions lengthwise the carriage travel to predetermine a point in the carriage travel at which the circuit closer will be operated.

41. In a writing adding machine, the combination with a frame and carriage, of a register including denominational members and springs operated carrying mechanism, means for operating the register, restoring means for the carrying mechanism including an electric motor and a single circuit closer controlling the operation thereof, and means for operating the circuit closer and including a device adjustable on the frame to determine the point in the carriage movement at which the restoring means shall operate.

42. In a writing adding machine, the combination with a frame and carriage, of a register including denominational members and carrying mechanism, means for operating the register, restoring means for the carrying mechanism including an electric motor and a circuit closer which, when operated, will cause the immediate restoration of the carrying mechanism, and means for operating the circuit closer and including a plurality of devices relatively adjustable lengthwise of the carriage travel to predetermine successive points in such travel at which the circuit closer will be operated.

43. In a writing adding machine, the combination with a frame and carriage, of a register including denominational members and carrying mechanism, retracting means for the carrying mechanism including an electric motor, and means whereby the circuit will be automatically closed through the motor repeatedly by the movement of the carriage and during a single traverse of the frame by said carriage.

44. In a writing adding machine, the combination with a frame and carriage, of a register including denominational members and spring operated carrying mechanism, retracting or restoring means for the carrying mechanism including an electric motor, and means controlling the operation of the motor and including a series of devices relatively adjustable lengthwise of the carriage travel to cause successive operations of the motor and restoring means as the carriage reaches different positions predetermined by the adjustment of said devices.

45. In a writing adding machine, the combination with a frame and carriage, of a register mounted on the carriage and including denominational members and carrying mechanism, restoring means for the carrying mechanism including a motor mounted on the frame, and means controlling the operation of the motor and including a series of devices adjustable relative to each other lengthwise of the carriage travel to predetermine the points in such travel at which the restoring means shall operate.

46. In a writing adding machine, the combination with a frame and carriage, of a register mounted on the carriage and including a series of denominational members and carrying mechanism, means for operating the register, restoring means for the carrying mechanism including a motor, and means controlling the operation of the motor and including a plurality of devices adjustable relative to each other on the frame to predetermine the points in the carriage travel at which the restoring means shall operate.

47. In a writing adding machine, the combination with a frame and carriage, of a register mounted on the carriage and including denominational members and carrying mechanism, means for operating the register, and restoring means for the carrying mechanism, said restoring means including a motor mounted on the frame.

48. In a writing adding machine, the combination with a frame and carriage, of a register movable with the carriage and including denominational members and carrying mechanism, means for operating the register, restoring means for the carrying mechanism including an electric motor mounted on the frame, a circuit closer mounted on the carriage, a variable connection between the circuit closer and motor to accommodate the movement of the circuit closer relative to the motor with the carriage, and means for operating the circuit closer.

49. In a writing adding machine, the combination with a frame and carriage, of a register movable with the carriage and including denominational members and carrying mechanism, means for operating the register, and restoring means for the carrying mechanism including an electric motor mounted on the frame, a circuit closer mounted on the carriage, and a motor circuit carried in part by the frame and carriage respectively, and including sliding contacts for maintaining connection between those parts of the circuit carried by the frame and carriage, notwithstanding the movement of the carriage relative to the frame.

50. In a writing adding machine, the combination with two primary elements, to wit, a frame and carriage, of a register carried by one of said primary elements and including denominational members, carrying mechanism and a restoring device for the carrying mechanism, and operating means for the restoring device, said operating means being carried by the other primary element of the machine and disposed constantly in operative relation with the restoring device.

51. In a writing adding machine, the combination with a frame and carriage, of a register mounted on the carriage and including denominational members, carrying mechanism and a restoring arm for the carrying mechanism, means for operating the register, and a yoke carried by the frame and disposed in co-operative relation to the restoring arm of the register in all positions of the carriage.

52. In a writing adding machine, the combination with a frame and carriage, of a register mounted on the carriage and including denominational members, carrying mechanism and a restoring arm for the carrying mechanism, means for operating the register, a swinging yoke mounted on the frame in co-operative relation to the restoring arm, and a yoke operating motor mounted on the frame.

53. In a writing adding machine, the combination with a frame and carriage, of a register mounted on the carriage and including denominational members, carrying mechanism and a restoring arm, a yoke mounted on the frame to co-act with the restoring arm, means for operating the register, a yoke operating motor carried by the frame, and a motor controlling device mounted on the carriage.

54. In a writing adding machine, the combination with a frame and carriage, of a register movable with the carriage and including denominational members and carrying mechanism, a master actuator movable with the carriage and also having movement across the register, restoring means for the carrying mechanism of the register, and means controlling the operation of the restoring means and including a part movable with the master actuator as the same moves across the register.

55. In a writing adding machine, the combination with a frame, carriage, keys and printing mechanism, of a computing device mounted on the frame, another computing device mounted on the carriage, each computing device including a series of denominational members and carrying means, a master actuator for each computing device; said actuators being movable to successive denominational members as the carriage advances, and means for operating the actuators.

56. In a writing adding machine, the combination with a frame, carriage, keys and printing mechanism, of a computing device mounted on the frame, another computing device mounted on the carriage, each computing device including a series of denominational members and carrying means, two master actuators one for each computing device, said actuators being movable across the respective computing devices by the advance of the carriage, and operating means common to both actuators.

57. In a writing adding machine, the combination with a frame, carriage, keys and printing mechanism, of a computing device mounted on the frame, another computing device mounted on the carriage, each computing device including a series of denominational members and carrying means, an actuator for each computing device, operating means common to both actuators, means whereby the advance of the carriage will cause both actuators to traverse the computing devices laterally, and means whereby one of the actuators will be caused to traverse a computing device more than once during a single excursion of the carriage from one limit of its movement to another.

58. In a writing adding machine, the combination with a frame, carriage, keys and printing mechanism, of a computing device mounted on the frame, another computing device mounted on the carriage, each computing device including a series of denominational members and carrying means, and one of said computing devices being adjustable lengthwise of the carriage travel to different column positions, means for operating said computing devices, and means adjustable with the adjustable computing device to determine the positions of the carriage in which the other computing device will be operative.

59. In a writing adding machine, the combination with a frame, carriage, keys and printing mechanism, of a computing device mounted on the frame, another computing device mounted on the carriage, each computing device including a series of denominational members and carrying means, an actuator for each of said computing devices, at least one of said actuators and its computing device being normally stationary with respect to their relative lateral movement, and means controlling such relative lateral movement of said computing device and its actuator and including a member adjustable with the other computing device lengthwise of the carriage travel.

60. In a writing adding machine, the combination with a frame, carriage, keys and printing mechanism, of a computing device adjustable on the frame to different column positions, a second computing device movable with the carriage, each of said computing devices including a series of denominational members and carrying means, and means causing corresponding denominational members of both computing devices to be simultaneously operated in any position of adjustment of the computing device mounted on the frame.

61. In a writing adding machine, the combination with a frame, carriage, keys and printing mechanism, of a computing device adjustably mounted on the frame to different column positions lengthwise of the carriage travel, a second computing device movable with the carriage, both of said computing devices including denominational members and carrying means, actuators for the respective computing devices, one of said actuators and its computing device being normally stationary as to its relative lateral movement, means for causing such relative lateral movement to be derived from the travel of the carriage and including a device adjustable with the computing device mounted on the frame.

62. In a writing adding machine, the combination with a frame, carriage, keys and printing mechanism, of a computing device mounted on the frame, another computing device mounted on the carriage, each computing device including a series of denominational members and carrying means, actuators for said computing devices, said actuators having their operation controlled by the keys and at least one of said actuators being movable across its computing device but normally stationary relative to said computing device during the travel of the carriage, and means for causing the movement of the carriage to advance said actuator across its computing device, said means including a device adjustable with the computing device mounted on the frame.

63. In a writing adding machine, the combination with a frame, carriage, keys and printing mechanism, of a plurality of column registers mounted on the frame, an additional register mounted on the carriage, each of said registers including denominational members and carrying means, a master actuator movable with the carriage to successive column registers, and another actuator repeatedly advanced across the additional register as the first named actuator is advanced across successive column registers.

64. In a writing adding machine, the combination with a frame, carriage, keys and printing mechanism, of a plurality of column registers mounted on the frame, an additional register mounted on the carriage, each of said registers including denominational members and carrying means, and two actuators movable with the carriage, one of said actuators being advanced by the carriage to successive denominational members of successive column registers and the other actuator being repeatedly advanced by the carriage to successive denominational members of the additional register.

65. In a writing adding machine, the combination with a frame, carriage, keys and printing mechanism, of a plurality of column registers mounted on the frame, an additional register mounted on the carriage, each of said registers including denominational members and carrying means, an actuator for the column registers, an additional actuator for the additional register, and means for repeatedly advancing the additional actuator across the additional register during a single excursion of the carriage, said means including devices adjustable with the column registers.

66. In a writing adding machine, the combination with a frame and a carriage, of computing devices mounted on the frame and carriage respectively and each including a series of denominational members and carrying means, operating means common to both computing devices, and automatic means variable to predetermine whether one of said computing devices shall operate for addition or subtraction.

67. In a writing adding machine, the combination with a frame and a carriage, of computing devices mounted on the frame and carriage respectively and each including a series of denominational members and carrying means, and one of said computing devices being reversible, common operating means for said computing devices, and variable automatic means for reversing one of said computing devices.

68. In a writing adding machine, the combination with a frame and a carriage, of computing devices mounted on the frame and carriage respectively and each including a series of denominational members and carrying means, operating means common to said computing devices, and means adjustable lengthwise of the carriage travel and controlled by the movement of the carriage to determine whether one of said computing devices shall operate for addition or subtraction.

69. In a writing adding machine, the combination with a frame and a carriage, of computing devices mounted on the frame and carriage respectively and each including a series of denominational members and carrying means, operating mechanism mounted on the carriage and common to said computing devices, and variable means controlled by the movement of the carriage for reversing the operation of one of the computing devices.

70. In a writing adding machine, the combination with a frame, carriage, keys and printing mechanism, of computing devices mounted on the frame and carriage respectively, one of said computing devices being reversible and each of said computing devices including denominational members and carrying means, means whereby depression of the keys will result in the simultaneous operation of corresponding denominational members of said computing devices, and variable automatic means for determining whether the operation of one of said computing devices shall be for addition or subtraction.

71. In a writing adding machine, the combination with a frame, a carriage, and keys and printing mechanism both movable with the carriage, of computing devices mounted on the frame and carriage respectively, each of said computing devices being reversible, means whereby depression of the keys will result in the simultaneous operation of corresponding denominational members of said computing devices, and means adjustable to different positions and operated by the movement of the carriage to reverse the operation of one computing device.

72. In a writing adding machine, the combination with a frame, carriage, keys and printing mechanism, of a reversible register movable with the carriage, a series of column registers mounted on the frame, means for operating the reversible register simultaneously with the operation of each of the column registers, and means carried by a column register to cause the reversal of the reversible register.

73. In a writing adding machine, the combination with a frame, carriage, keys and printing mechanism, of a reversible register movable with the carriage, a series of registers mounted stationarily on the frame, means for operating each of the stationary registers and the reversible register simultaneously, and means including a device adjustable on the frame for reversing the reversible register.

74. In a writing adding machine, the combination with a frame, carriage, keys and printing mechanism, of a plurality of registers relatively adjustable on the frame to different column positions, a reversible register movable with the carriage, two actuators one for the registers mounted on the frame and the other for the register on the carriage, the register on the carriage being normally inoperative by its actuator, means including a plurality of devices relatively adjustable on the frame to predetermine at what points in the travel of the carriage the register mounted thereon will be operative, means including a device also adjustable on the frame to determine whether the register mounted on the carriage shall be operated for addition or subtraction, and operating means common to the two actuators.

75. In a writing adding machine, the combination with a frame, carriage and printing mechanism, of a series of registers relatively adjustable on the frame but normally stationary, a reversible register movable with the carriage, operating mechanism common to all the registers and including keys movable with the carriage, said operating mechanism also including a reversible master actuator for the reversible register, means for advancing said actuator across the register, said means including a series of devices relatively adjustable on the frame, and reversing means for said actuator, said reversing means including the part also adjustable on the frame.

76. In a writing adding machine, the combination with a primary actuator shaft rotatable in a constant direction, of a secondary actuator shaft, reversible gearing between said shafts, a series of keys, means whereby depression of the keys will rotate the primary actuator shaft, a rotary actuator operated by the secondary actuator shaft, and a register operated by said actuator.

77. In a writing adding machine, the combination with a frame, carriage, keys and printing mechanism, of a primary actuator shaft rotatable in one direction, means for operating the same, a secondary actuator shaft, an actuator operated thereby, a register operated by the actuator, and reversible gearing between the primary and secondary shafts and variable controlled by the movable carriage, whereby said shafts are normally rotatable in the same direction but may be caused to rotate in opposite directions.

78. In a writing adding machine, the combination with a frame, carriage, keys and printing mechanism, of a primary actuator shaft, an actuator operated thereby a secondary actuator shaft, means whereby depression of the keys will result in the operation of the primary actuator shaft, an actuator operated by the secondary actuator shaft, registers operated by said actuators, reversible gearing between the two shafts, and means operated by the movement of the carriage to reverse the gearing.

79. In a writing adding machine, the combination with a frame, carriage, keys and printing mechanism, of two actuator shafts, means whereby depression of the keys will result in the rotation of one shaft, reversible gearing between the shafts, actuators operated by the respective shafts, registers operated by the actuators, and means controlled by the movement of the carriage for reversing the gearing.

80. In a writing adding machine, the combination with a frame, carriage, keys and printing mechanism, of two actuator shafts mounted on the carriage, reversing mechanism between the shafts, means for causing said shafts to rotate upon the depression of the keys, actuators operated by the respective shafts, registers mounted on the frame and carriage respectively, and operated by the respective actuators, and means controlled by the movement of the carriage for reversing the gearing.

81. In a register, the combination with a series of denominational members, of spring urged carrying and locking mechanism, operative to engage and carry the denominational members in either of two directions for addition or subtraction and to positively lock the members carried against movement in either direction.

82. In a register, the combination, with a series of denominational members, of spring urged mechanism, normally held inactive but releasable by the denominational members to effect direct carrying thereof in either of two directions, and to positively lock the member carried against movement in either direction.

83. In a register, the combination with a series of denominational members of spring urged carrying and locking devices operative to carry the denominational members in either direction for addition or subtraction, and to positively lock said members, against forward or backward movement and selectors normally restraining the carrying devices, and operative by the denominational members during their movement in either direction to release the carrying devices.

84. In a register, the combination with a series of number wheels, of two oppositely disposed series of spring urged carrying levers, pawls movably carried by said levers and disposed to engage opposite sides of the number wheels, and wheel operated latches coacting with the levers to control the movement thereof.

85. In a register, the combination with a series of number wheels, of two sets of carrying levers, pawls movably carried by the levers of the respective sets and disposed to engage opposite sides of the number wheels, and selectors or latches each normally restraining two carrying levers and adapted to be operated by a wheel to release either carrying lever independently of the other.

86. In a register, the combination with a series of denominational members, of spring urged carrying mechanism operative to carry the denominational members in either of two directions and to lock the same positively against movement in either direction.

87. In a register, the combination with a series of denominational members, two sets of spring urged carrying devices each operative to carry the denominational members for addition and for subtraction, and to lock the members carried positively against movement in either direction.

88. In a register, the combination with a series of denominational members, of two sets of combined carrying and locking devices arranged to carry the denominational members in opposite directions and to lock the same, positively against movement in either direction and a single set of selectors or latches operative by the denominational members and controlling the operation of both sets of carrying and locking devices.

89. In a register, the combination with a series of denominational members, of spring urged carrying mechanism operative to carry said members in opposite directions, selectors or latches normally restraining the carrying mechanism but movable by the denominational members to release the carrying mechanism, and restoring means operative to move the carrying mechanism and latches to normal position.

90. In a register, the combination with a series of denominational members, of two sets of spring urged carrying devices arranged to operate said members in opposite directions, of latches normally restraining said carrying devices and arranged to be operative by the denominational members to release the carrying devices, and restoring mechanism common to the latches and carrying devices and operative to move the same back to normal position.

91. In a register, the combination with a series of denominational members, of two sets of spring urged carrying devices arranged to operate the denominational members in opposite directions, a single set of latches or selectors controlling the operation of both sets of carrying devices, and operated by the denominational members, and restoring means common to the latches and carrying devices and operative to move the same back to normal position.

92. In a register, the combination with a series of denominational members, of spring urged carrying mechanism arranged to operate the denominational members in opposite directions, latches controlling the operation of the carrying devices and movable in different directions by the denominational members, and restoring means for moving the latches and carrying devices back to normal position.

93. In a register, the combination with a series of denominational members, of two sets of carrying devices arranged to operate said members in opposite directions, a single set of pivoted selectors or latches normally restraining both sets of carrying devices and arranged to be swung in one direction or the other from normal central position by the denominational members to release the carrying devices of either set, and restoring means common to the carrying devices and operative to move the same to normal position.

94. In a register, the combination with a series of number wheels, of carrying mechanism including two sets of carrying levers and pawls, wheel operated latches controlling the operation of the carrying levers, and a restoring device movable to restore any carrying levers which have been operated and to also restore any latches which have been moved out of normal position.

95. In a register, the combination with a series of number wheels, of two sets of carrying devices arranged to carry the wheels in opposite directions, a set of wheel operated selectors or latches common to both sets of carrying devices, and a restoring member operative to first restore the carrying devices which have been operated and to then restore the operated latches.

96. In a register, the combination with a series of number wheels, of carrying mechanism operative to carry the number wheels in different directions and including two sets of carrying levers having their active ends opposed, a set of pivoted latches each having one end normally in engagement with the opposed ends of two carrying levers and having its opposite end disposed to be engaged and operated by a number wheel, and a restoring device arranged to engage and restore any carrying lever of either set which may have been operated and also arranged to engage either side of a displaced latch and to swing the same back to normal central position.

97. In a writing adding machine, the combination with a frame and carriage, of a computing device mounted on the frame, a second computing device mounted on the carriage, one of said computing devices being operative for either addition or subtraction, means for simultaneously operating said computing devices and automatic means for determining whether the operation of one of the computing devices shall be for addition or subtraction.

98. In a writing adding machine, the combination with a frame and carriage, of two computing devices, one mounted on the frame and the other on the carriage, operating mechanism common to both the computing devices and including keys, and variable means controlled by the movement of the carriage to predetermine whether the operation of one of said computing devices shall be an adding or a subtracting operation.

99. In a writing-adding machine, the combination with a frame and carriage, of a computing device mounted on the frame, a second computing device mounted on the carriage, one of said computing devices being operative for either addition or subtraction, means for simultaneously operating said computing devices and automatic means for determining whether one of the computing devices shall operate and whether for addition or subtraction, said automatic determining means being variable to permit of its coming into action at one of several predetermined points in the travel of the carriage.

100. In a writing-adding machine, the combination with a frame and carriage, of a computing device mounted on the frame, a second computing device mounted on the carriage, one of said computing devices being operative for either addition or subtraction, means for simultaneously operating said computing devices and automatic means for determining whether one of the computing devices shall operate and whether for addition or subtraction, said automatic determining means including a part adjustable to different positions to determine at what point in the movement of the carriage the automatic means shall be operated.

101. In a writing-adding machine, the combination with a frame, carriage, keys and printing mechanism, of a reversible register movable with the carriage, a series of column registers mounted on the frame, means for operating the reversible register simultaneously with the operation of each of the column registers, and means carried by a column register and brought into action by the travel of the reversible register to cause the reversal of the reversible register.

102. In a writing-adding machine, the combination with a carriage, keys and printing mechanism, of a reversable register movable with the carriage, a series of registers mounted stationarily on the frame, means for operating each of the stationary registers and the reversable register simultaneously and means including a device adjustable on the frame and brought into action by the movement of the reversable register to reverse said reversable register.

103. In a writing-adding machine, the combination with a frame and carriage, of computing devices mounted on the frame and carriage respectively, one of said computing devices being reversible, means for simultaneously operating said computing devices, and variable means for automatically reversing the reversible computing device.

104. In a writing-adding machine, the combination with a frame and carriage, of computing devices mounted on the frame and carriage respectively, one of said computing devices being reversible, means for simultaneously operating said computing devices, and variable means for automatically reversing the reversible computing device at a plurality of predetermined points in the travel of the carriage.

In testimony whereof I affix my signature in presence of two witnesses.

HARRY A. FOOTHORAP.

Witnesses:
   J. F. HULOZEWELL,
   ARTHUR A. RIEME.